United States Patent
King et al.

(10) Patent No.: US 8,769,443 B2
(45) Date of Patent: Jul. 1, 2014

(54) TOUCH INPUTS INTERACTING WITH USER INTERFACE ITEMS

(75) Inventors: Nicholas V. King, San Jose, CA (US); Todd Benjamin, Saratoga, CA (US); Brett Bilbrey, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 419 days.

(21) Appl. No.: 12/704,418

(22) Filed: Feb. 11, 2010

(65) Prior Publication Data
US 2011/0197153 A1 Aug. 11, 2011

(51) Int. Cl.
*G06F 3/0488* (2013.01)

(52) U.S. Cl.
USPC ............................................. 715/863

(58) Field of Classification Search
CPC .. G06F 3/04883; G06F 3/0488; G06F 3/0481
USPC ................... 715/863, 864, 770, 773
See application file for complete search history.

(56) References Cited

U.S. PATENT DOCUMENTS

| | | | |
|---|---|---|---|
| 5,072,412 A | 12/1991 | Henderson, Jr. et al. | |
| 5,119,079 A | 6/1992 | Hube et al. | |
| 5,561,758 A | 10/1996 | Hocker et al. | |
| 5,914,716 A | 6/1999 | Rubin et al. | |
| 6,331,840 B1 | 12/2001 | Nielson et al. | |
| 2002/0018051 A1 | 2/2002 | Singh | |
| 2005/0057524 A1 | 3/2005 | Hill et al. | |
| 2005/0228938 A1* | 10/2005 | Khare et al. | 711/103 |
| 2006/0026521 A1 | 2/2006 | Hotelling et al. | |
| 2006/0036944 A1 | 2/2006 | Wilson | |
| 2006/0181519 A1 | 8/2006 | Vernier et al. | |
| 2006/0267966 A1 | 11/2006 | Grossman et al. | |
| 2007/0097096 A1 | 5/2007 | Rosenberg | |
| 2007/0198950 A1 | 8/2007 | Dodge et al. | |
| 2007/0247443 A1 | 10/2007 | Philipp | |
| 2008/0168403 A1* | 7/2008 | Westerman et al. | 715/863 |
| 2009/0066668 A1* | 3/2009 | Kim et al. | 345/173 |
| 2009/0307631 A1 | 12/2009 | Kim et al. | |

OTHER PUBLICATIONS

Harrison, Chris and Hudson, Scott E., "Scratch Input: Creating Large, Inexpensive, Unpowered and Mobile Finger Input Surfaces," [online]. UIST'08, Oct. 19-22, 2008, Monterey, California, Copyright 2008 ACM, Retrieved from the Internet: http://www.chrisharrison.net/projects/scratchinput/ScratchInputHarrison.pdf, 4 pages.
"Multimodal Requirements for Voice Markup Languages," W3C Working Draft Jul. 10, 2000, [online] [retrieved on Nov. 24, 2009]. Copyright © 2000 WC3®. Retrieved from: http://www.w3.org/TR/multimodal-reqs, 18 pages.

(Continued)

*Primary Examiner* — Thanh Vu
(74) *Attorney, Agent, or Firm* — Morrison & Foerster LLP

(57) ABSTRACT

Techniques for managing user interactions with items on a user interface are disclosed. In one aspect, a representation of an opening is presented in response to touch input. A display object is moved over the opening, and the display object is processed in response to the moving. In another aspect, touch input pinching two opposite corners of a display object followed by touch input flicking the display object is received and the display object is deleted in response to the inputs. In another aspect, touch input centered over a display object is received and the display object is deleted in response to the input. In another aspect, touch input corresponding to swiping gestures are received and a display object is securely deleted in response to the gestures.

15 Claims, 25 Drawing Sheets

(56) References Cited

OTHER PUBLICATIONS

Nezu, T., "Mitsubishi Demos '3D Touch Panel'—Tech-On!" Nikkei Electronics, Mar. 11, 2009, [online]. Retrieved from: http://techon.nikkeibp.co.jp/english/NEWS_EN/20090310/166952/?P=1, 2 pages.

Rekimoto, J., Ishizawa, T., Schwesig, C., Oba, H., "PreSense: Interaction Techniques for Finger Sensing Input Devices," [online]. UIST '03 Vancouver, BC, Canada, © ACM 2003, CHI Letters, vol. 5, Issue 2, Retrieved from: ftp.csl.sony.co.jp/person/rekimoto/papers/rekimoto-uist03.pdf, pp. 203-212.

* cited by examiner

TOUCH INPUTS INTERACTING WITH USER INTERFACE ITEMS

TECHNICAL FIELD

This subject matter is generally related to user interactions with items displayed on a user interface of a device.

BACKGROUND

Graphical user interfaces present display objects to users. Each display object can represent a system object. For example, a display object can be an icon that represents a file stored on a device. Users can interact with the display objects in various ways. Users can select (e.g., with a mouse or other input device) display objects to invoke functionality associated with the display objects. For example, a user can select a file to cause a system window displaying the contents of the file to be presented in the user interface.

Users can also drag display objects around the user interface. For example, a user can drag and drop a display object representing a file over a display object representing a folder. In response, the file can be moved into the folder.

SUMMARY

Techniques and systems supporting user interactions with items displayed on a user interface of a device are disclosed.

In one aspect, touch input to a device is received from a user, and the device presents a graphical representation of an opening in response to the touch input. Second touch input moving a display object over the opening is received, and the device processes the display object in response to the moving. In another aspect, a device receives touch input pinching two opposite corners of a display object presented on a user interface, followed by touch input flicking the display object. The device deletes the display object in response to the inputs. In yet another aspect, a device receives touch input centered over a display object presented on a user interface and deletes the display object in response to the input. In another aspect, a device receives touch input corresponding to a swiping gestures made with two or more fingers of a single hand. The device determines that the swiping gestures are made over a display object presented in the user interface and deletes the display object in response to the gestures.

Particular embodiments of the subject matter described in this specification can be implemented to realize one or more of the following advantages. Users can be provided with a more intuitive environment for interacting with items displayed on a user interface. Users can use real world analogies such as holes, windows, and doors to indicate desired processes to be applied to items. Users can use real world analogies such as shrinking and flicking an item, or drawing an X or other symbol over an item, to indicate that an item should be deleted. Users can use real word analogies such as a shredding motion to indicate that an item should be securely deleted.

DESCRIPTION OF DRAWINGS

Like reference numbers and designations in the various drawings indicate like elements.

DETAILED DESCRIPTION

Example Device

Figure 1A:
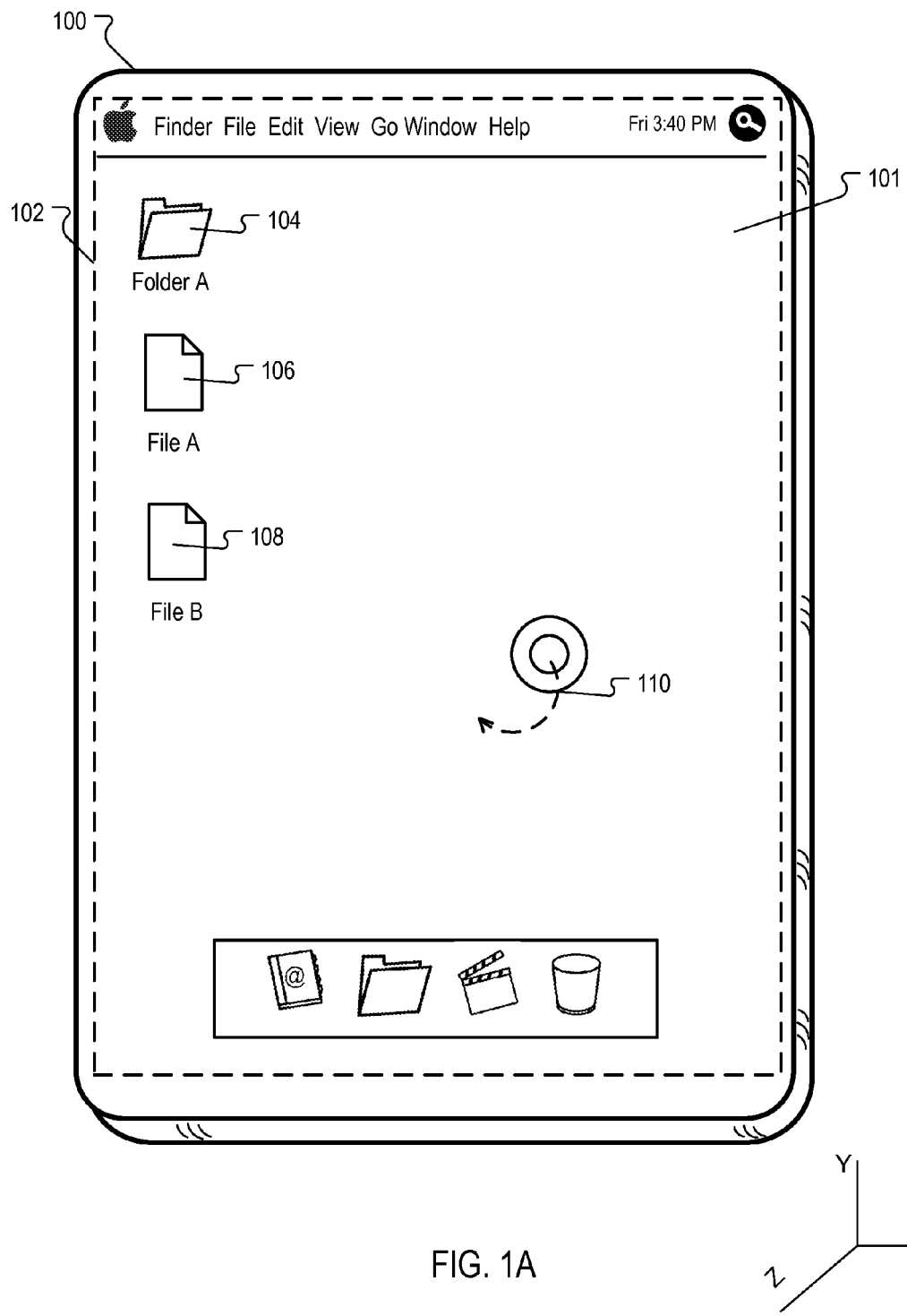
FIG. 1A illustrates an example user device displaying an example user interface.

FIG. 1A illustrates example user device 100 displaying example user interface 101. Device 100 can be, for example, a computer, a tablet computer, a handheld computer, a personal digital assistant, a cellular telephone, a network appliance, a camera, a smart phone, an enhanced general packet radio service (EGPRS) mobile phone, a network base station, a media player, a navigation device, an email device, a game console, a laptop computer, or a combination of any two or more of these data processing devices or other data processing devices.

Device Overview

In some implementations, device 100 includes touch-sensitive display 102. Touch-sensitive display 102 can implement liquid crystal display (LCD) technology, light emitting polymer display (LPD) technology, or some other display technology. Touch sensitive display 102 can be sensitive to haptic and/or tactile contact with a user. In some implementations, touch-sensitive display 102 is also sensitive to touch inputs received in proximity to, but not actually touching, display 102. In addition, device 100 can include a touch-sensitive surface (e.g., a trackpad or touchpad).

In some implementations, touch-sensitive display 102 can include a multi-touch-sensitive display. A multi-touch-sensitive display can, for example, process multiple simultaneous points of input, including processing data related to the pressure, degree, and/or position of each point of input. Such processing facilitates gestures and interactions with multiple fingers, chording, and other interactions. Other touch-sensitive display technologies can also be used, e.g., a display in which contact is made using a stylus or other input tool.

A user can interact with device 100 using various touch inputs, e.g., when a user touches touch sensitive display 102. Gesture inputs can also be derived from multiple touch inputs, e.g., where a user moves his or her finger (or other input tool) across touch sensitive display 102. An example gesture input is a swipe input, where a user swipes his or her finger (or other input tool) across touch-sensitive display 102. In some implementations, device 100 can detect inputs that are received in direct contact with display 102, or that are received within a particular vertical distance of display 102 (e.g., within one or two inches of display 102). Users can simultaneously provide input at multiple locations on display 102. For example, inputs simultaneously touching at two or more locations can be received.

In some implementations, device 100 can implement various device functionalities. As part of one or more of these functionalities, device 100 presents graphical user interfaces (e.g., graphical user interface 101) on touch-sensitive display 102 of device 100, and also responds to touch input received from a user, for example, through touch-sensitive display 102.

In some implementations, the graphical user interface can include one or more display objects, e.g., display objects 104, 106, and 108. Each display object is a graphical representation of a system object. For example, a display object can be an icon corresponding to a system object or a system window displaying the contents of a system object (e.g., the contents of a file or directory). Example system objects include device functions, applications, windows, files, directories, alerts, events, or other identifiable system objects. In some implementations, the display objects can be configured by a user, e.g., a user may specify which display objects are displayed, and/or may download additional applications or other software that provides other functionalities and corresponding display objects.

A user can interact with the display objects using various touch inputs. For example, users can use touch inputs to create openings in user interface 101 and then move objects over the openings The device can then process the objects in response to the inputs. As another example, users can use touch inputs to squeeze and flick objects to indicate that the objects should be deleted, or can use touch inputs to draw an X or other symbol through objects to indicate that the objects should be deleted. As yet another example, users can use touch inputs to mimic the action of a shredder, indicating that objects should be securely deleted. Each of these scenarios will be described in more detail below.

Example Interactions Digging a Hole in a Device User Interface

FIG. 1A illustrates example touch inputs 110 corresponding to a digging gesture made by a user. The user provides touch inputs 110 at a location on user interface 101 of device 100. A digging gesture can correspond to a user positioning his or her finger (or stylus) at a particular height above device 100 on the z-axis, and moving his or her finger down along the z-axis and to the side in the x-y plane. Alternatively or in addition, the digging gesture can correspond to a scraping motion, e.g., one or more short gestures substantially in the x-y plane that mimic scraping at display 102 with a fingernail.

In response to one or more touch inputs 110, user interface 101 displays a graphical representation of an opening in the user interface.

Figure 1B:
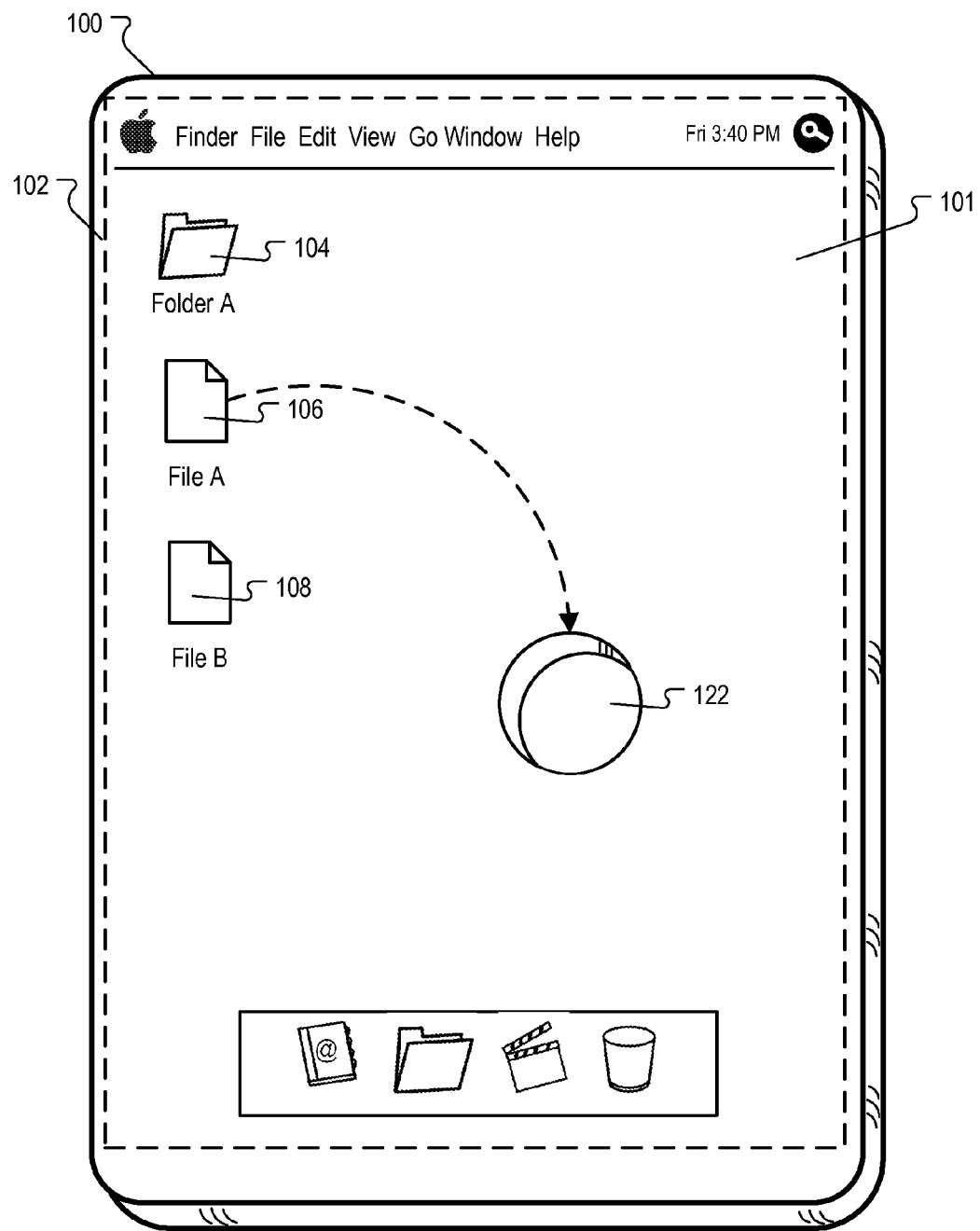
FIG. 1B illustrates a graphical representation of an opening that is displayed in the example user interface.

FIG. 1B illustrates graphical representation 122 of an opening that is displayed in user interface 101. Opening 122 is presented in user interface 101 at the location where touch inputs 110 were received. In some implementations, the size of the opening can be determined by the number of touch inputs received at the location on the device. For example, the more times a user provided separate touch inputs 110 at the same location, the larger the opening can be. In some implementations, the size of the opening can be determined by a pressure corresponding to the touch inputs. For example, the greater the pressure of the touch inputs, the larger the opening can be. The pressure can be calculated, for example, from the speed with which a user gestured along the z-axis, or the pressure with which a user pressed on display 102. The size of the opening can be the diameter of the opening or the depth of the opening.

In some implementations, user interface 101 also presents a graphical representation of dirt, or other material next to opening 122. This dirt or other material represents material that was removed to create the opening. The user interface 101 can present an animation of more material appearing next to opening 122 in response to each touch input 110. For example, the user interface can present an animation of dirt flying out of opening 122 and into the pile of material.

While opening 122 illustrated in FIG. 1B is shown as a depression in the screen of device 100, other representations of opening 122 can also be used. For example, opening 122 can be represented as a hole in the ground. The hole can be a graphical representation of a hole in dirt or rock. A pile of dirt or rocks can be displayed on the user interface next to the opening. As another example, opening 122 can be represented by a tunnel. The bottom of the tunnel can be illustrated as connecting to another location, for example, another device in communication with device 100. The sides of the tunnel can be illustrated as being made out of plastic, metal, or another material. As yet another example, opening 122 can be represented as a hole in device 100 itself. The hole can be represented as having sides and a bottom that are made up of the inner components of an electronic device, for example, wiring and circuit boards. Other representations can also be used. For example, opening 122 can be represented as a black hole in space or as a worm hole in space.

As illustrated in FIG. 1B, once opening 122 is displayed, a user provides additional touch input selecting display object 106 and dragging and dropping display object 106 over opening 122. In response to this input, device 100 processes display object 106. Device 100 can process display object 106 in various ways. For example, device 100 can secure the system object corresponding to display object 106, move the system object corresponding to display object 106 to a new directory, or copy the system object corresponding to display object 106 to another device. Each of these actions is described in more detail below with reference to FIG. 3.

In some implementations, display object 106 is removed from user interface 101 as part of the processing.

Figure 1C:
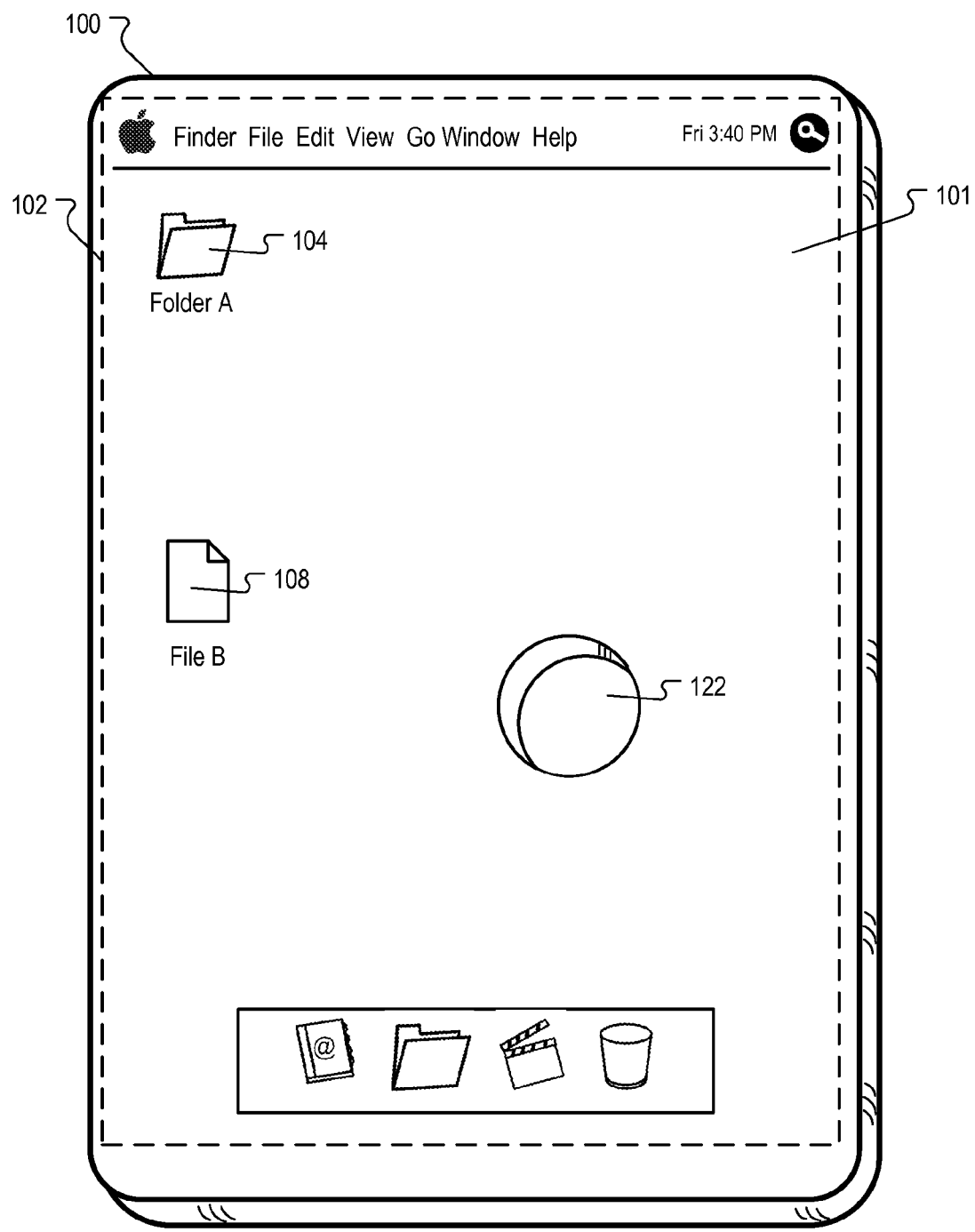
FIG. 1C illustrates the example user interface after a display object has been removed from the user interface.

FIG. 1C illustrates example user interface 101 after display object 106 has been removed from user interface 101. Opening 122 is still displayed in user interface 101. A user can close opening 122 through touch input, for example, by making one or more sweeping gestures over opening 122. In some implementations, a graphical representation of dirt or other material is presented next to opening 122. In these implementations, user interface 101 can present an animation of the dirt or the other material filling in opening 122 in response to the touch input.

Example Interactions Opening a Window or Door in a Device User Interface

Figure 2A:
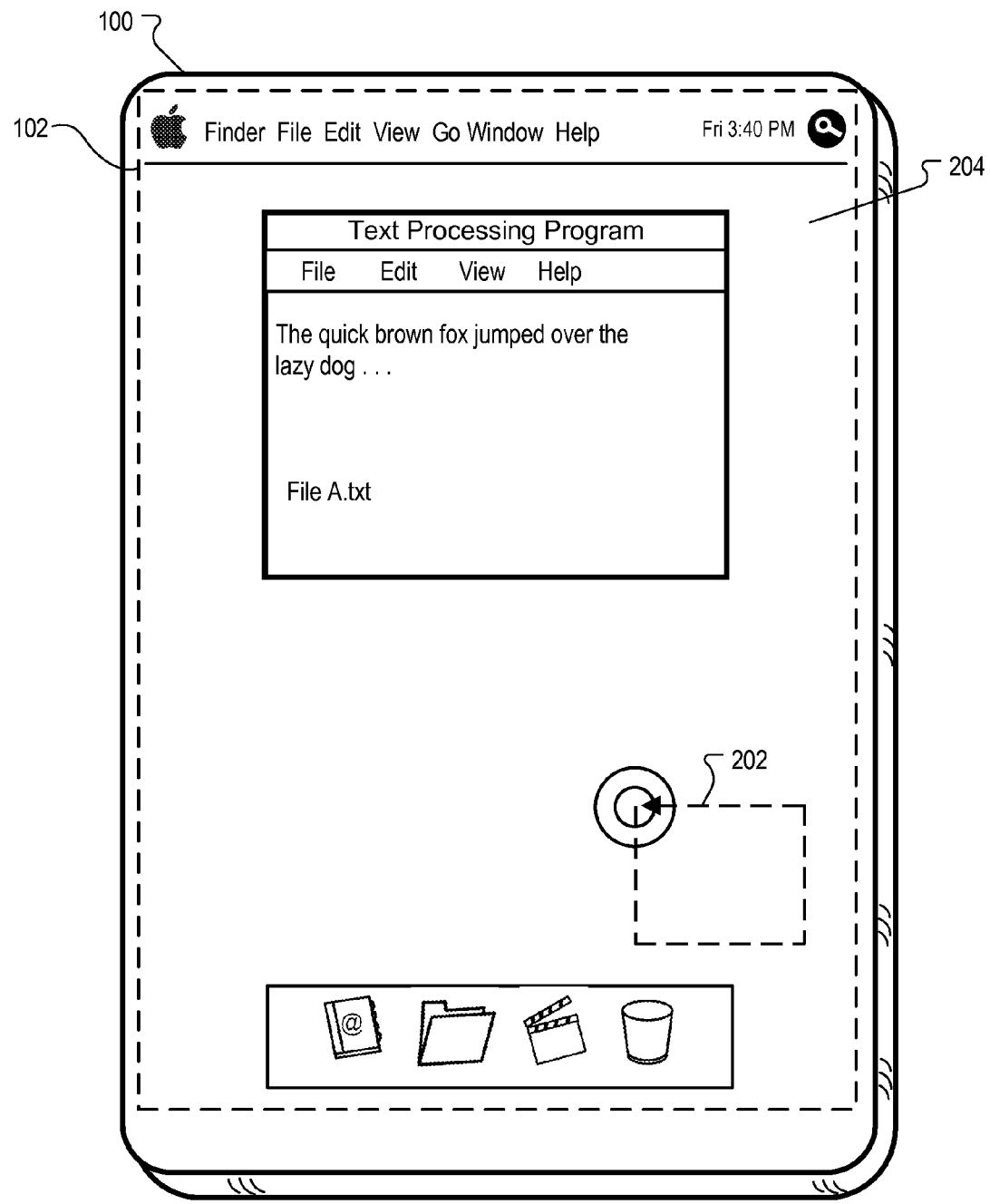
FIG. 2A illustrates an example touch input corresponding to drawing a pattern on a user interface.

FIG. 2A illustrates example touch input 202 corresponding to drawing a pattern on user interface 204 of device 100. User interface 204 includes display object 206, illustrated as a system window displaying the contents of a file.

In response to input 202, user interface 204 presents a graphical representation corresponding to the pattern. The graphical representation can be, for example, a graphical representation of a portal. A portal is a way of moving between two points, for example, a door, a window, a trap door, a tunnel, a sliding panel, or a gate.

Figure 2B:
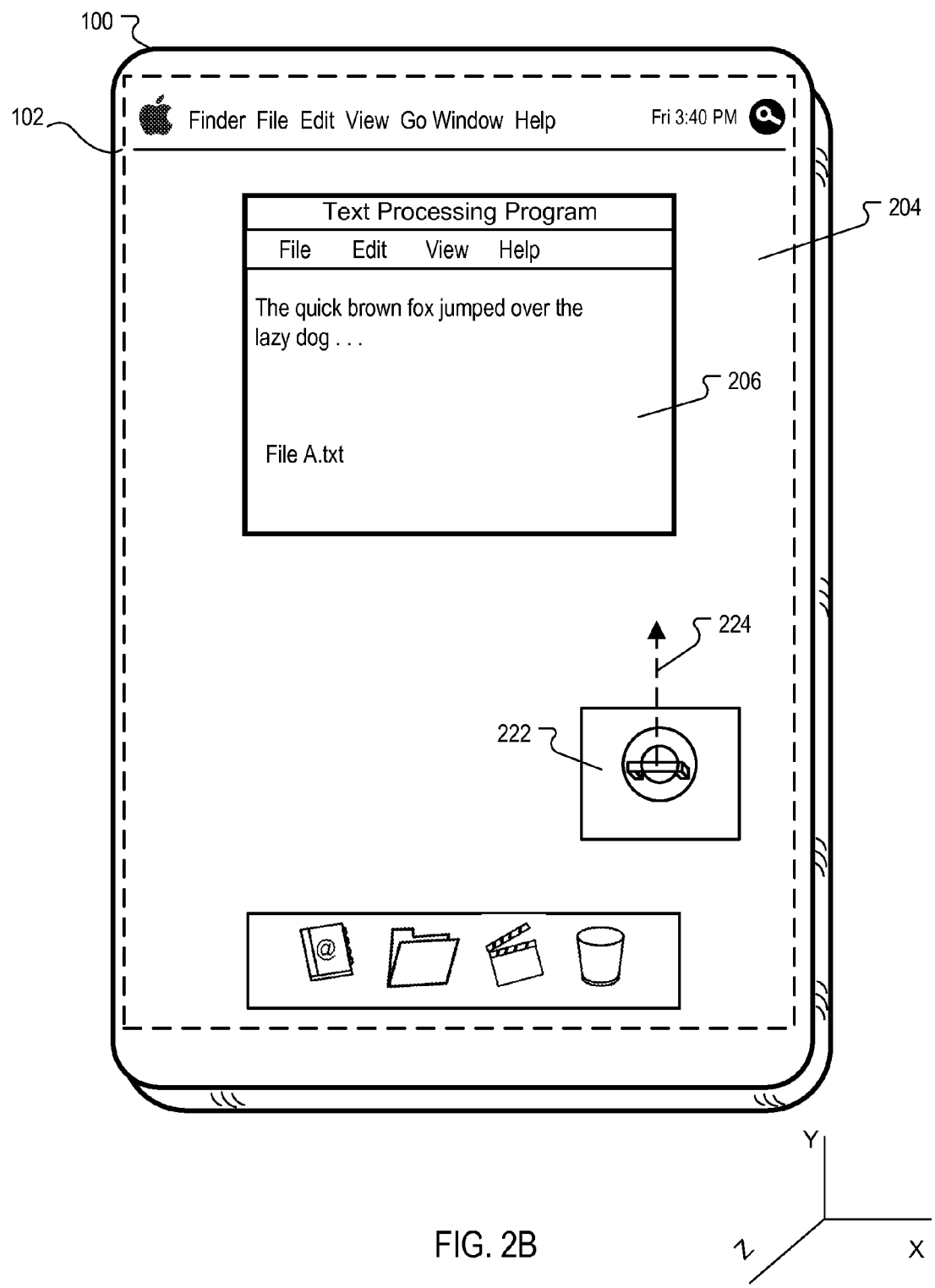
FIG. 2B illustrates an example graphical representation of a trap door.

FIG. 2B illustrates an example graphical representation of trap door 222. Trap door 222 has a size and shape corresponding to the pattern drawn by the user with touch input 202. Touch input 202 corresponds to a rectangular pattern; therefore, trap door 222 is rectangular. However, other patterns, for example, circles or squares, can also be drawn, resulting in different shaped representations. Trap door 222 is initially illustrated as being closed.

A user can provide another touch input to open trap door 222. In FIG. 2B, this input is illustrated by swiping gesture 224 along the y-axis. However, a user can alternatively use a swiping gesture along the x-axis, a lifting gesture along the z-axis, or a gesture along multiple axes. In response to input 224, user interface 204 presents a graphical representation of an opening. The opening corresponds to an open trap door.

Figure 2C:
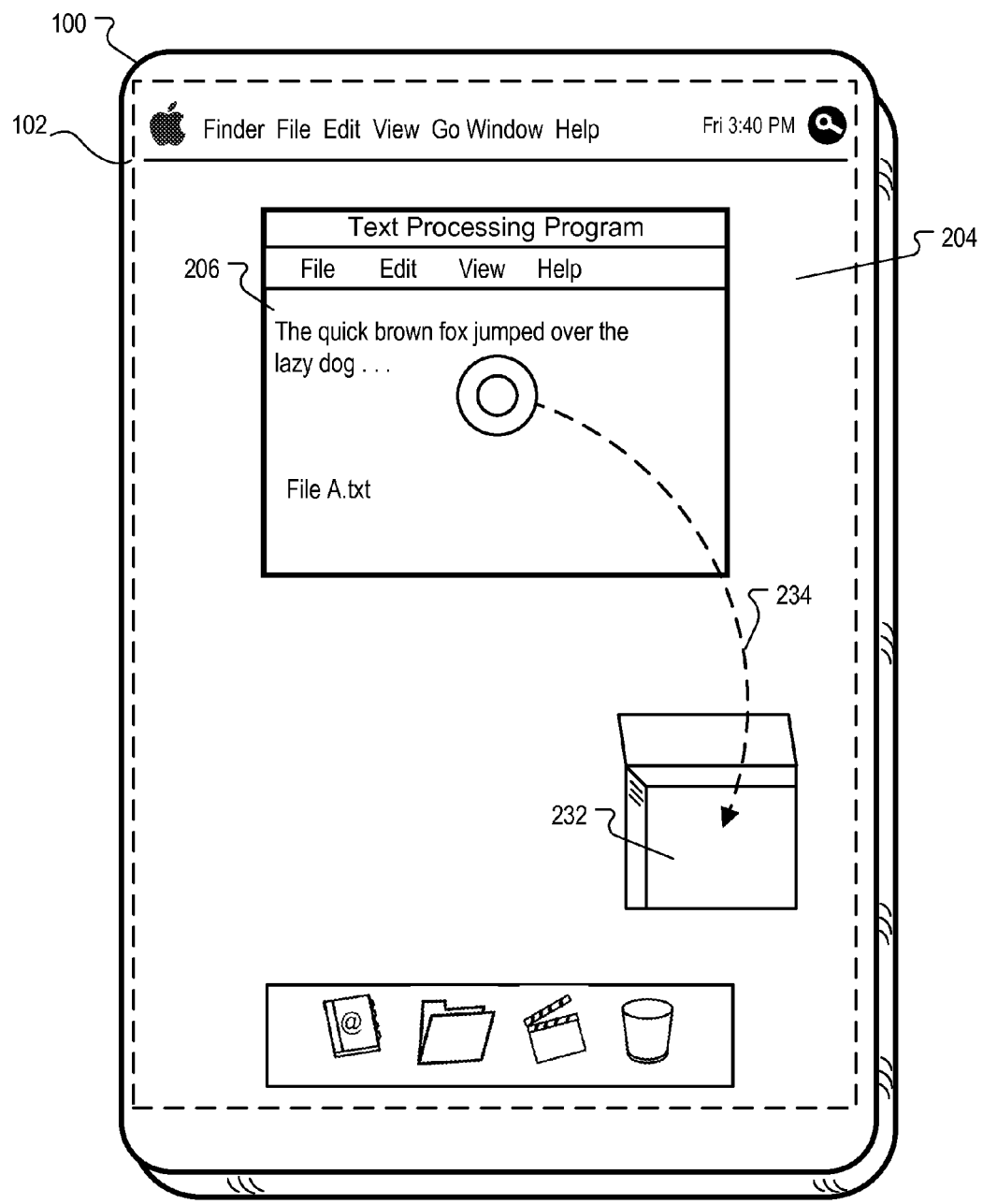
FIG. 2C illustrates an example graphical representation of an opening displayed in the user interface.

FIG. 2C illustrates an example graphical representation of opening 232 displayed in user interface 204 in response to input 224. Opening 232 is represented as an open trap door; however, other representations can alternatively be used.

As illustrated in FIG. 2C, a user provides additional touch input 234 dragging and dropping display object 206 over opening 232. In response to this input, device 100 processes the display object 206. Device 100 can process display object 206 in various ways. For example, device 100 can copy the system object corresponding to display object 206 to another device, make a backup of the system object corresponding to display object 206, or secure the system object corresponding to display object 206. Each of these actions is described in more detail below with reference to FIG. 4.

In some implementations, display object 206 is removed from user interface 201 as part of the processing.

Figure 2D:
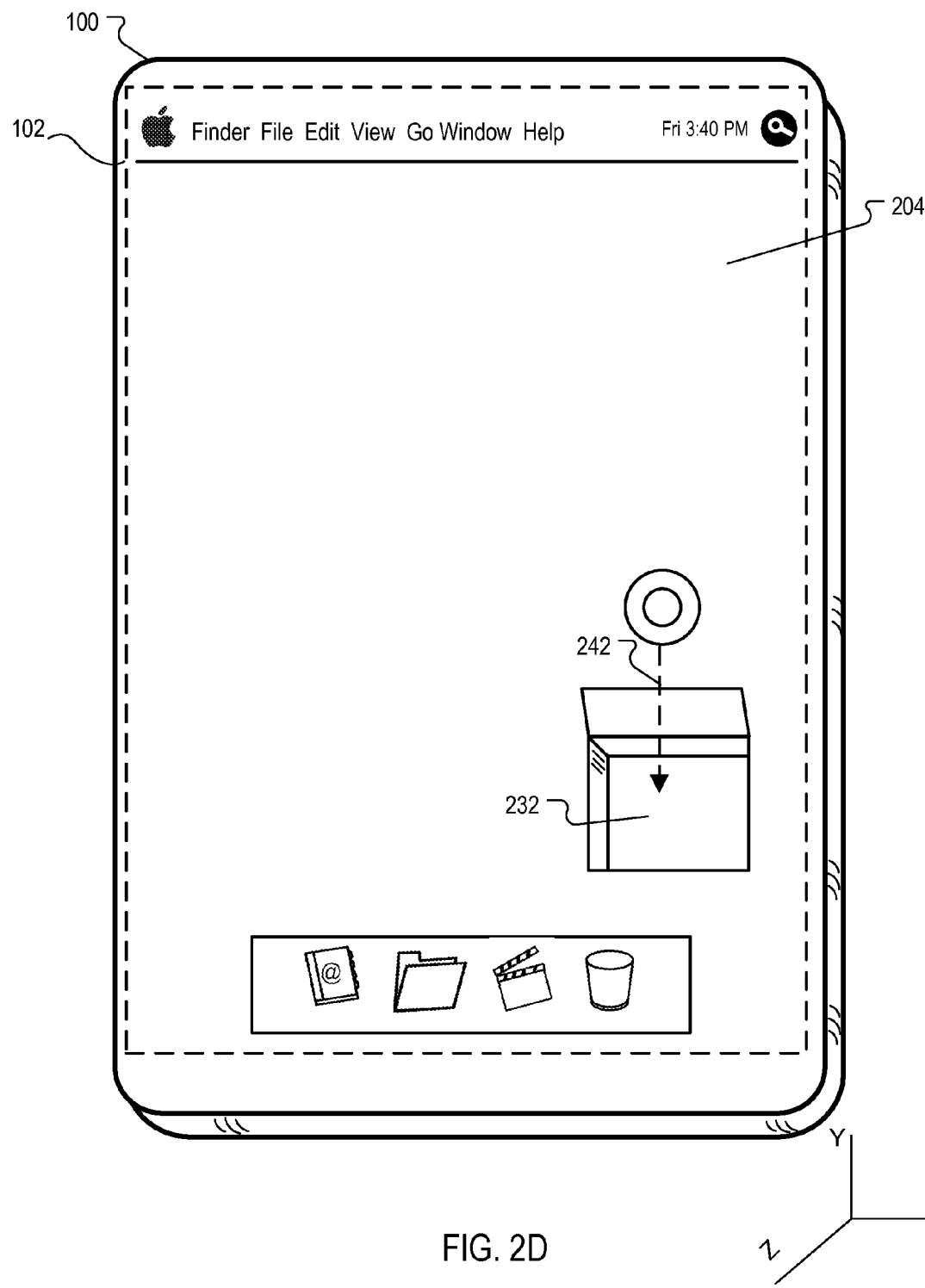
FIG. 2D illustrates the user interface after a display object has been removed from the user interface.

FIG. 2D illustrates example user interface 204 after display object 206 has been removed from user interface 201. Opening 232 is still displayed in user interface 201. A user can close opening 232 using touch input 242. Touch input 242 can be a touch input reversing touch input 224 used to create the opening. For example, if touch input 224 was a swiping gesture in the positive y-direction, touch input 242 can be a swiping gesture in the negative y-direction. Similarly, if touch input 224 was a swiping gesture in the positive x-direction, touch input 242 could be a swiping gesture in the negative x-direction, and if touch input 224 was a lifting gesture in the positive z-direction, touch input 242 could be a pushing gesture in the negative z-direction.

Figure 3:
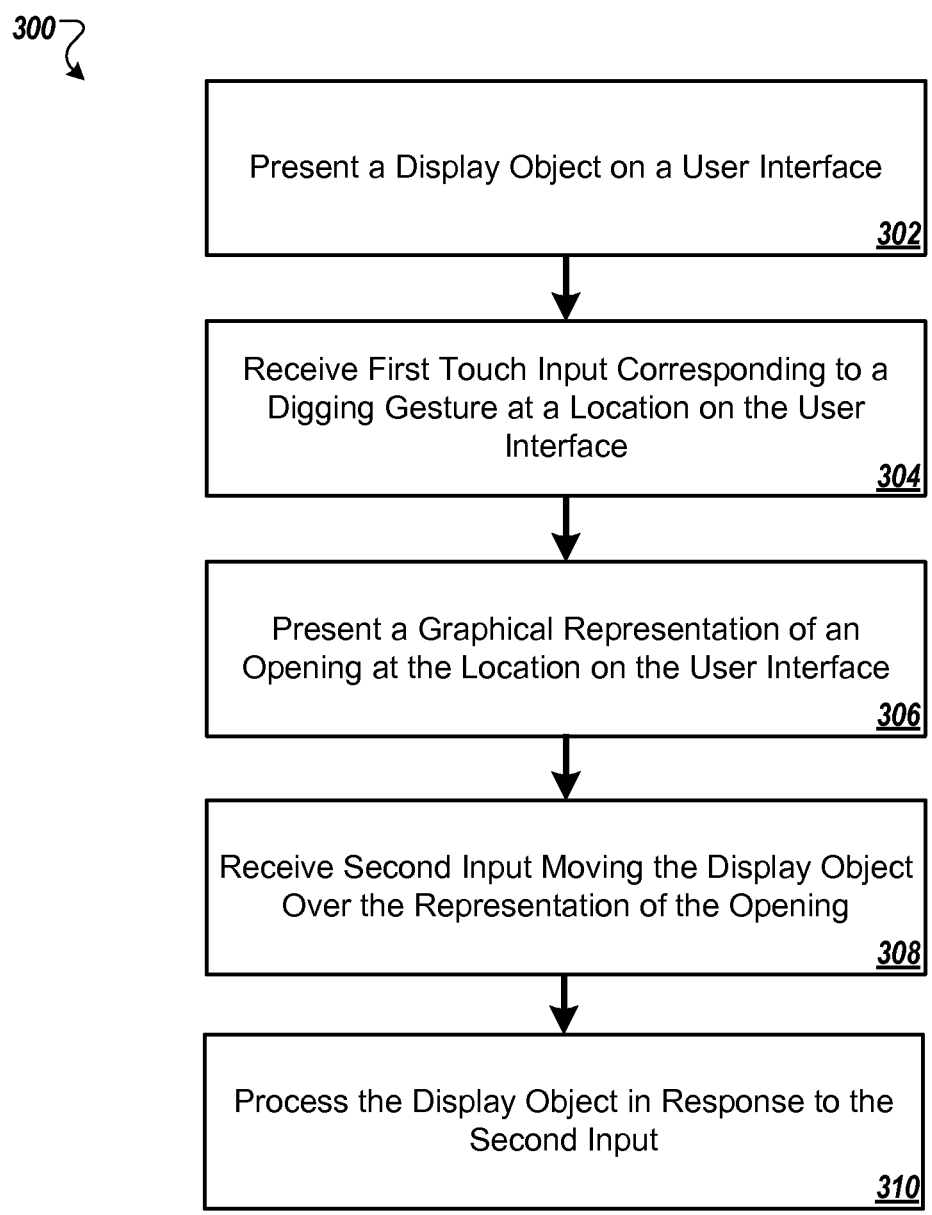
FIG. 3 is a flow diagram of an example process for presenting a graphical representation of an opening on a user interface of a device and processing an object moved over the hole or tunnel.

Example Processes for Presenting an Opening and Processing Display Objects Dragged and Dropped Over the Opening FIG. 3 is a flow diagram of example process 300 for presenting a graphical representation of an opening, e.g., a hole or tunnel, on a user interface of a device and processing an object moved over the graphical representation. For convenience, example process 300 will be described in reference to a device that performs process 300. The device can be, for example, device 100.

The device can present a display object on a user interface (302). The user interface can be, for example, the user interface 101 described above with reference to FIG. 1A. The display object corresponds to a system object. For example, the display object can be an icon representing a file or directory, or a system window displaying the contents of a file or directory.

The device can receive a first touch input corresponding to a digging gesture at a location on the device user interface (304). Example digging gestures are described above with reference to FIG. 1A.

The first touch input can be one or more touch input events received from a touch services module executing on the device. The touch services module is described in more detail below with reference to FIG. 12.

The first touch input can be represented as a single touch input event corresponding to touch inputs received at multiple locations on the drafting user interface, e.g., simultaneously. Alternatively, the first touch input can be represented as multiple touch input events. The device can determine that the multiple touch input events correspond to a single touch input, for example, if the time delay between the touch inputs is less than a threshold amount of time, or if one touch input event still persists when another is touch input event is received.

The device can present a graphical representation of an opening at the location on the user interface where the first touch input was received (306). For example, the graphical representation can be a hole corresponding to a depression in the user interface, a hole in the ground, a hole in the device, a worm hole, a black hole, or a tunnel, as described above with reference to FIG. 1B. Representations of other openings can also be used.

The device can determine the appropriate graphical representation to present from device settings stored on the device. For example, the device settings can specify that a particular representation should be used. Alternatively or additionally, the device can determine the appropriate graphical representation to present from an orientation of the device. For example, if the device is in a vertical position, such that the screen of the device is perpendicular to the ground, the appropriate representation can be a black hole or a worm hole. As another example, if the device is in a horizontal position, such that the screen of the device is parallel to the ground, the appropriate representation can be a hole or a tunnel. The device can also determine the appropriate representation according to an orientation of the device relative to other devices. For example, if the device is positioned above another device, the appropriate representation can be a tunnel connecting to the other device.

The device can also determine the appropriate size of the representation from the number of touch inputs received, as described above with reference to FIG. 1B.

The device can receive second input moving the display object over the representation of the opening (308). The second input can be, for example, touch input dragging and dropping the display object over the representation, as described above with reference to FIG. 1B. Alternatively or additionally, the display objects can be free to move around the device, and the second input can be input tilting the device to cause the display object to move over the opening. The second input can also be touch input flicking the display object over the opening.

The device can process the display object in response to the second input (310). The device can process the display object in various ways. In some implementations, the device can secure the display object in response to the second input. Securing the display object can involve securing the system object represented by the display object. For example, if the display object represents a file or directory, the device can create additional protection for the file or directory. This additional protection can be encrypting the file or directory, for example, using conventional encryption techniques. The additional protection can also include making backup copies of the file or directory, and optionally encrypting each copy. Making backup copies of the file or directory makes it more likely that the contents of the file or directory will be preserved, even if one copy of the file or directory is corrupted, e.g., by a disk failure on the device. The additional protection can also include moving the system object to a particular location in the device file system, for example, a particular directory with particular permission settings. Other additional protections, for example, obfuscating the file name of the system object, can also be used.

In some implementations, the device can create a directory in the device file system that corresponds to the opening, and move the system object corresponding to the display object into the directory in response to the second input. The device can prompt the user to enter a name and location for the directory once the first touch inputs are received, and use the information received from the user to name the directory.

In some implementations, the device can cause a copy of the system object corresponding to the display object to be sent to another device. The device can select a particular device to which to send the copy of the system object to as follows. First, the device can broadcast a request for responses from devices in its vicinity. Each response can include a location of the responding device. The device can process any received responses to determine that a particular device is below the device, and identify that particular device as the device to which the file should be sent. Once the device identifies the particular device, the device can establish a communication link with the particular device, for example, using conventional device communication techniques. The device can then cause a copy of the system object to be sent through the communication link. The device can establish the communication link in response to the first touch input, or in response to the second input.

The device can determine the appropriate way to process the display object from device settings stored on the device. Alternatively or additionally, the device can determine the appropriate way to process the display object from the position of the device relative to another device. For example, if the system detects that the other device is below the device, the system can send a copy of the system object to the other device. Otherwise, the device can process the display object in a different way.

In some implementations, the device closes the opening in response to third touch input received from a user. The third touch input can be a sweeping gesture, for example, as described above with reference to FIG. 1C.

Figure 4:
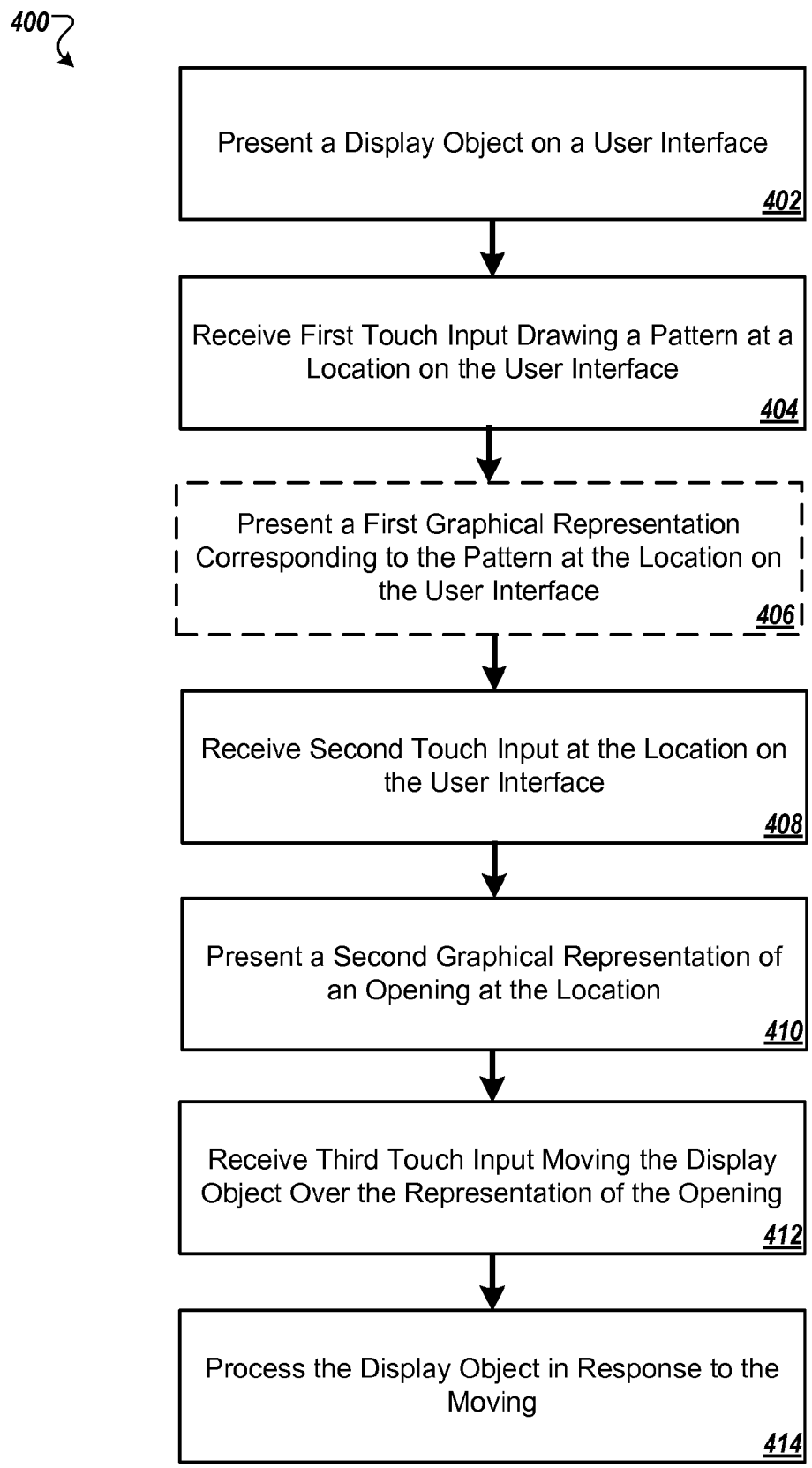
FIG. 4 is a flow diagram of an example process for presenting a graphical representation of an opening on a user interface of a device and processing an object moved over the graphical representation.

FIG. 4 is a flow diagram of example process 400 for presenting a graphical representation of an opening, e.g., a portal, on a user interface of a device and processing an object moved over the graphical representation. For convenience, example process 400 will be described in reference to a device that performs process 400. The device can be, for example, device 100.

The device can present a display object on a device user interface (402). The user interface can be, for example, the user interface 204 described above with reference to FIG. 2A. The display object can correspond to a system object. For example, the display object can be an icon representing a file or directory stored on device 100, or the display object can be a user interface window displaying the contents of a file or directory stored on device 100.

The device can receive first touch input drawing a pattern at a location on the device user interface (404). The first touch input can be one or more touch input events received from a touch services module executing on the device.

The device can optionally present a first graphical representation corresponding to the pattern (406). The graphical representation can be, for example, a portal. Example portals include windows, doors, trap doors, and sliding panels, as described above with reference to FIG. 2B. The first graphical representation is presented at the location where the first touch input is received.

The device can determine the appropriate representation from settings stored on the user device. For example, the device can store data that indicates that certain patterns correspond to certain graphical representations, and display the graphical representation corresponding to the pattern. For example, if the device stores data indicating that a square corresponds to a window and a rectangle corresponds to a trap door, the device can display a graphical representation of a window if the pattern best fits a square, and can display a graphical representation of a trap door if the pattern best fits a rectangle.

Alternatively, or additionally, the device can determine the appropriate representation from an orientation of the device. For example, if the device is in a vertical position, such that the screen of the device is perpendicular to the ground, the appropriate representation can be a window or a door. As another example, if the device is in a horizontal position, such that the screen of the device is parallel to the ground, the appropriate representation can be a trap door.

The device can also determine the appropriate size of the first representation from the first touch input. For example, the size of the first representation can correspond to the size of the pattern indicated by the first input.

The device can receive second touch input at the location where the first touch input was received (408). For example, the device can receive second touch input corresponding to a swiping gesture in an x or y-direction, or a lifting gesture in a z-direction.

The system displays a second graphical representation corresponding to an opening in response to the second touch input (410), for example, as described above with reference to FIG. 2C.

The system receives third input moving the display object over the opening (412). The third input can be, for example, touch input dragging and dropping the display object over the representation, as described above with reference to FIG. 2C. Alternatively or additionally, the third input can be input tilting the device or input flicking the display object, as described above with reference to FIG. 3.

The device processes the display object in response to the third input (414). The device can process the display object in various ways. In some implementations, the device can secure the system object corresponding to the display object, as described above with reference to FIG. 3. In some implementations, the device can send a copy of the system object corresponding to the display object to another device, as described above with reference to FIG. 3. In some implementations, the device can cause the state of the system object corresponding to the display object to be captured by a backup program executing on the device.

In some implementations, the device determines the appropriate way to process the display object from device settings stored on the device. In some implementations, the device determines the appropriate way to process the display object from the position of the device relative to another device. For example, if the system detects that the other device is below the device, the system can send a copy of the system object to the other device. Otherwise, the device can process the display object in a different way.

In some implementations, the way the device processes the display object corresponds to the representation of the opening that is presented on the display. Different representations can have different associated actions. For example, a graphical representation of a window can be associated with sending the system object corresponding to the display object to a backup program and a graphical representation of a trap door can be associated with sending a copy of the system object to another device or securing the system object.

In some implementations, the device closes the opening in response to fourth touch input received from a user, for example, as described above with reference to FIG. 2D.

Figure 5:
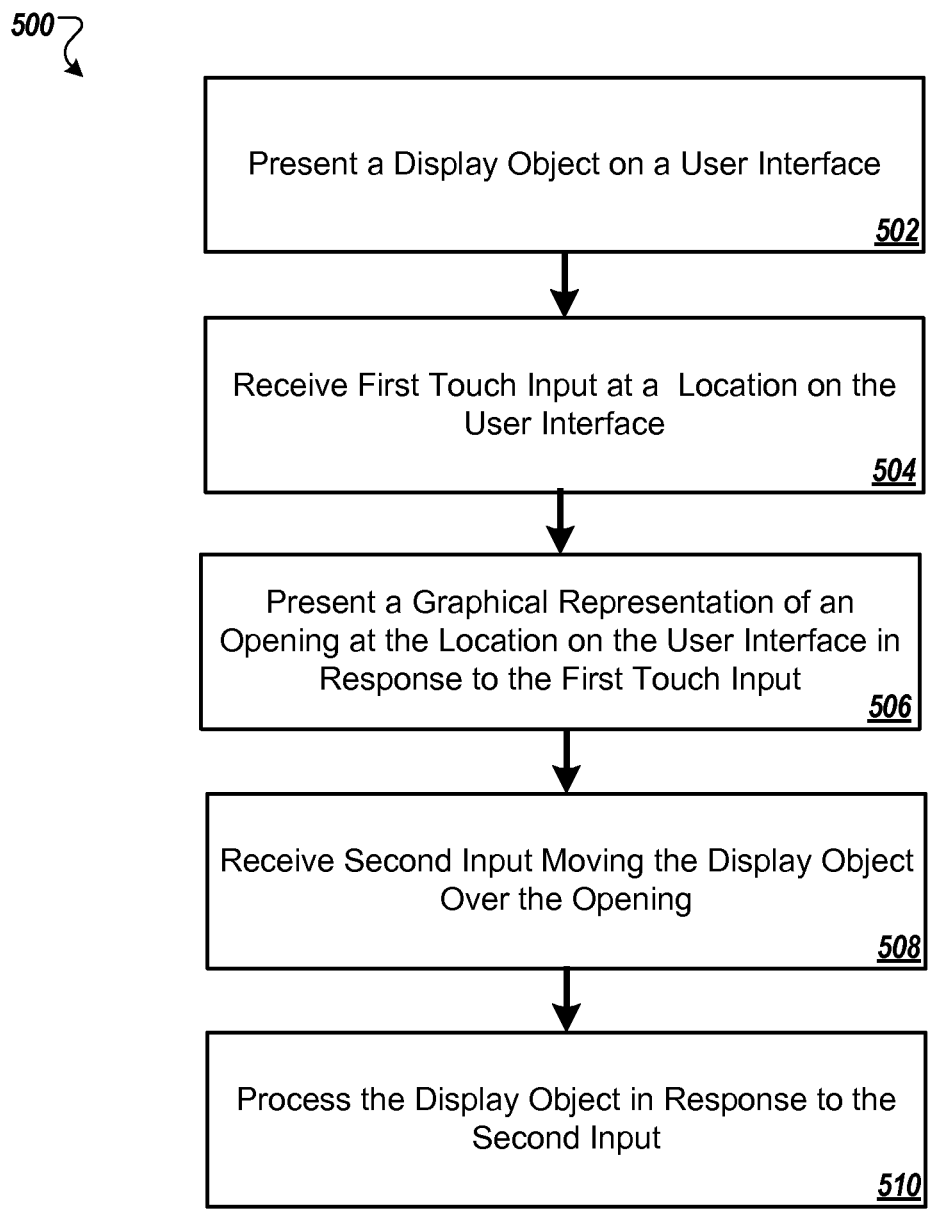
FIG. 5 is a flow diagram of an example process for generating a graphical representation of an opening on a user interface of a device and processing an object moved over the opening.

FIG. 5 is a flow diagram of example process 500 for generating a graphical representation of an opening on a user interface of a device and processing an object moved over the opening. For convenience, example process 500 will be described in reference to a device that performs process 500. The device can be, for example, device 100.

The device can present a display object on a device user interface (502), for example, as described above with reference to FIGS. 3 and 4. The device can receive first touch input at a location on the device user interface (504). The first touch input can be, for example, a digging gesture as described above with reference to FIG. 3. Alternatively, the first touch input can be a compound input corresponding to input drawing a pattern and input interacting with a graphical representation of the pattern, for example, as described above with reference to FIG. 4. Alternatively, the first touch input can be an input drawing a pattern.

The device can present a graphical representation of an opening at the location on the device user interface in response to the first touch input (506). The graphical representation of opening is space in something or space between two things. Example openings include holes, tunnels, and portals, as described above with reference to FIGS. 3 and 4. In some implementations, if the first touch input is input drawing a pattern, the device can present a graphical representation of an open portal without first requiring the input interacting with the portal.

The device can determine the appropriate representation from the first input that was received. For example, if the first input is a digging gesture, a hole or tunnel can be selected as the appropriate representation. As another example, if the first input draws a pattern, a portal can be selected as the appropriate representation. The system can also determine the appropriate representation from device settings and/or an orientation of the device, as described above with reference to FIGS. 3 and 4.

The device can receive second touch input moving the display object over the opening (508). The device can process the display object in response to the second touch input (510). In general, the system can process the display object by processing a system object associated with the display object. Example processing is described above with reference to FIGS. 3 and 4.

In some implementations, the device can receive input putting the device into a particular state before receiving the first and second touch inputs. The particular state causes the device to take the actions described above in response to the touch inputs described above.

Example Interactions Flicking a Display Object to Delete the Display Object

FIGS. 6A-6D illustrate example user interactions deleting object 602 displayed on user interface 604 of device 100.

Figure 6A:
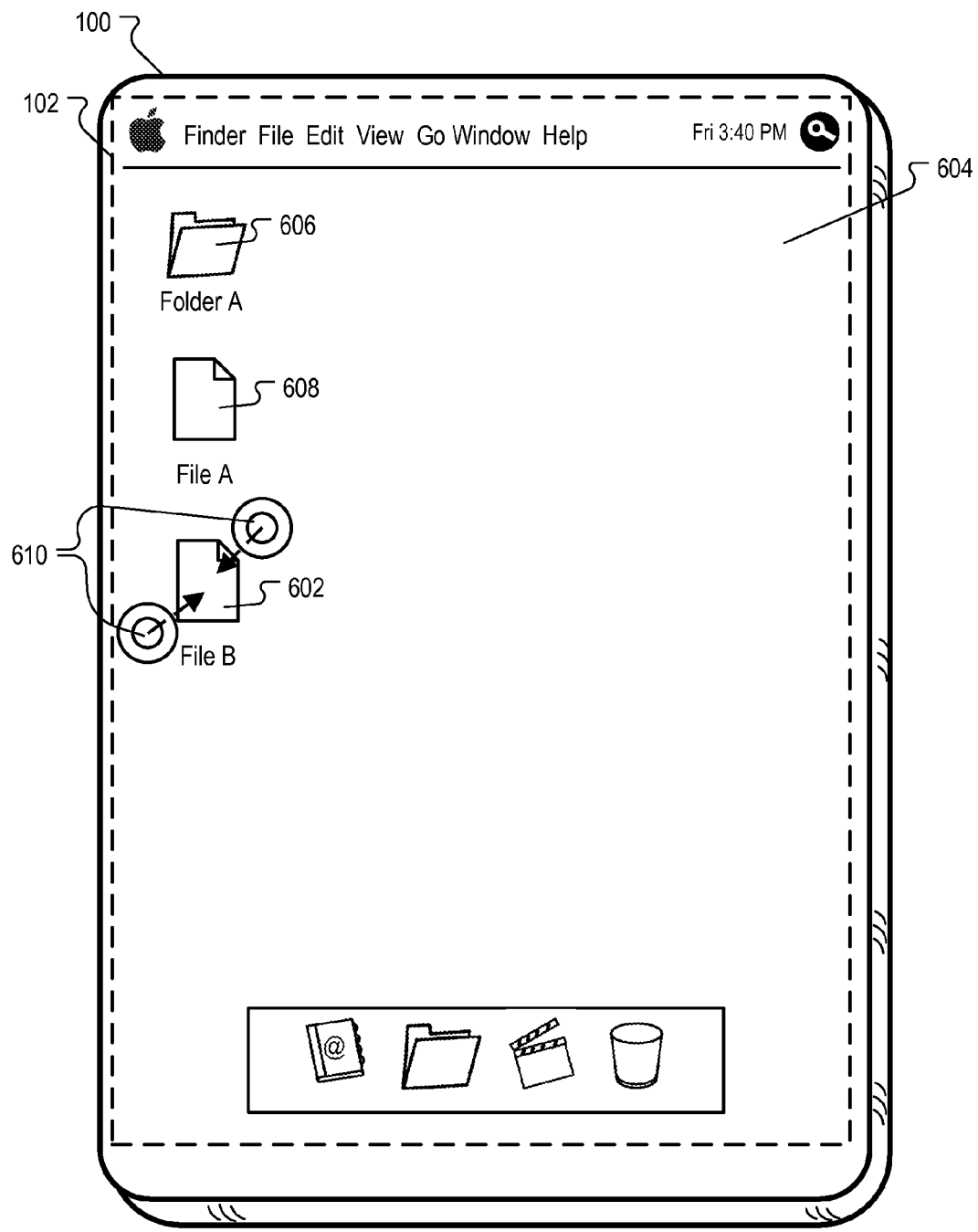
FIGS. 6A-6D illustrate example user interactions deleting a display object displayed on a user interface.

User interface 604 presents display objects 602, 606, and 608. A user can delete one of the display objects using a sequence of touch inputs to device 100. For example, a user can delete display object 602 as follows. First, as illustrated in FIG. 6A, the user can provide touch input 610 pinching two opposite corners of display object 602. In response to this input, user interface 604 can present an animation showing display object 602 becoming smaller, e.g., shrinking.

Figure 6B:
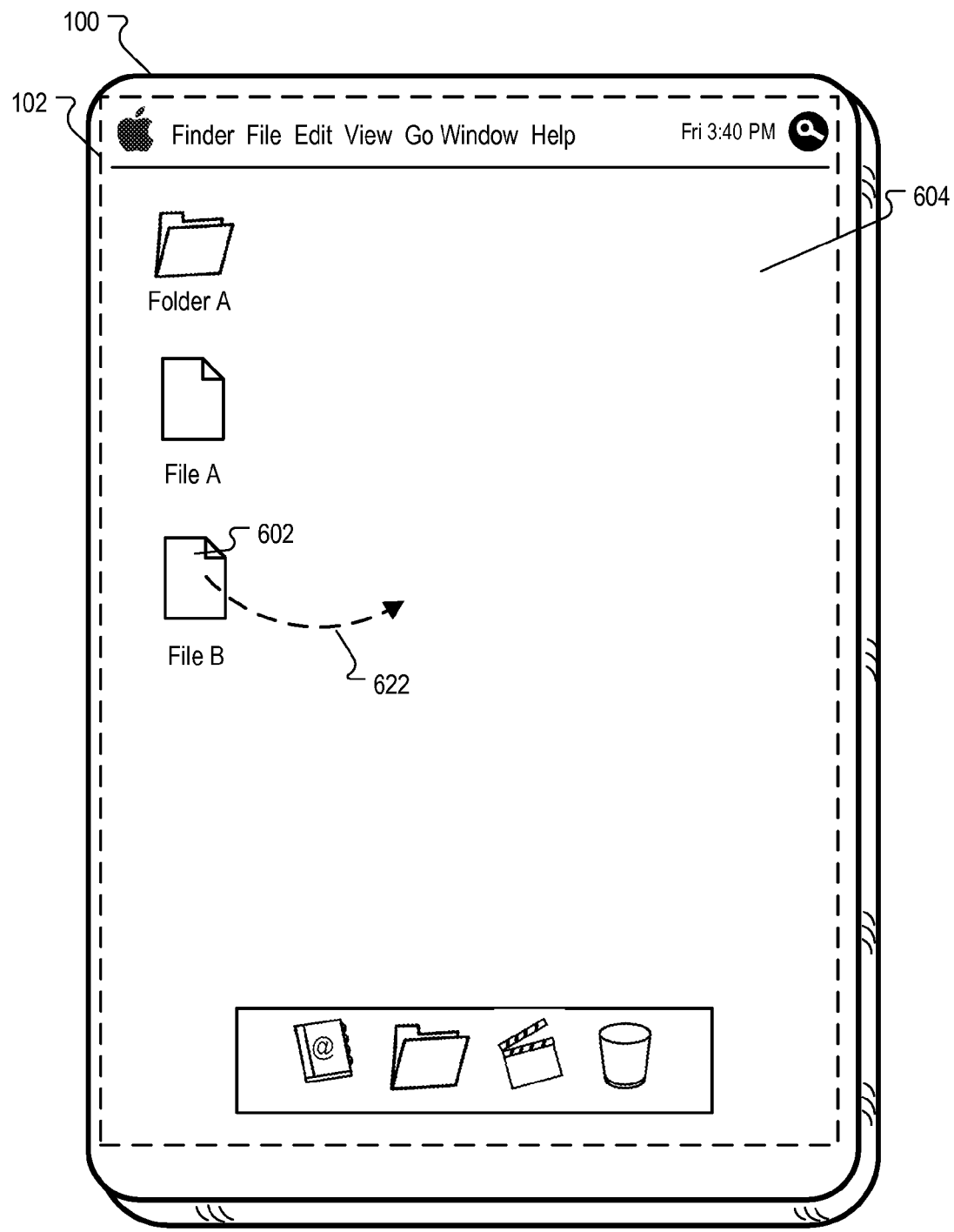
Figure 6C:
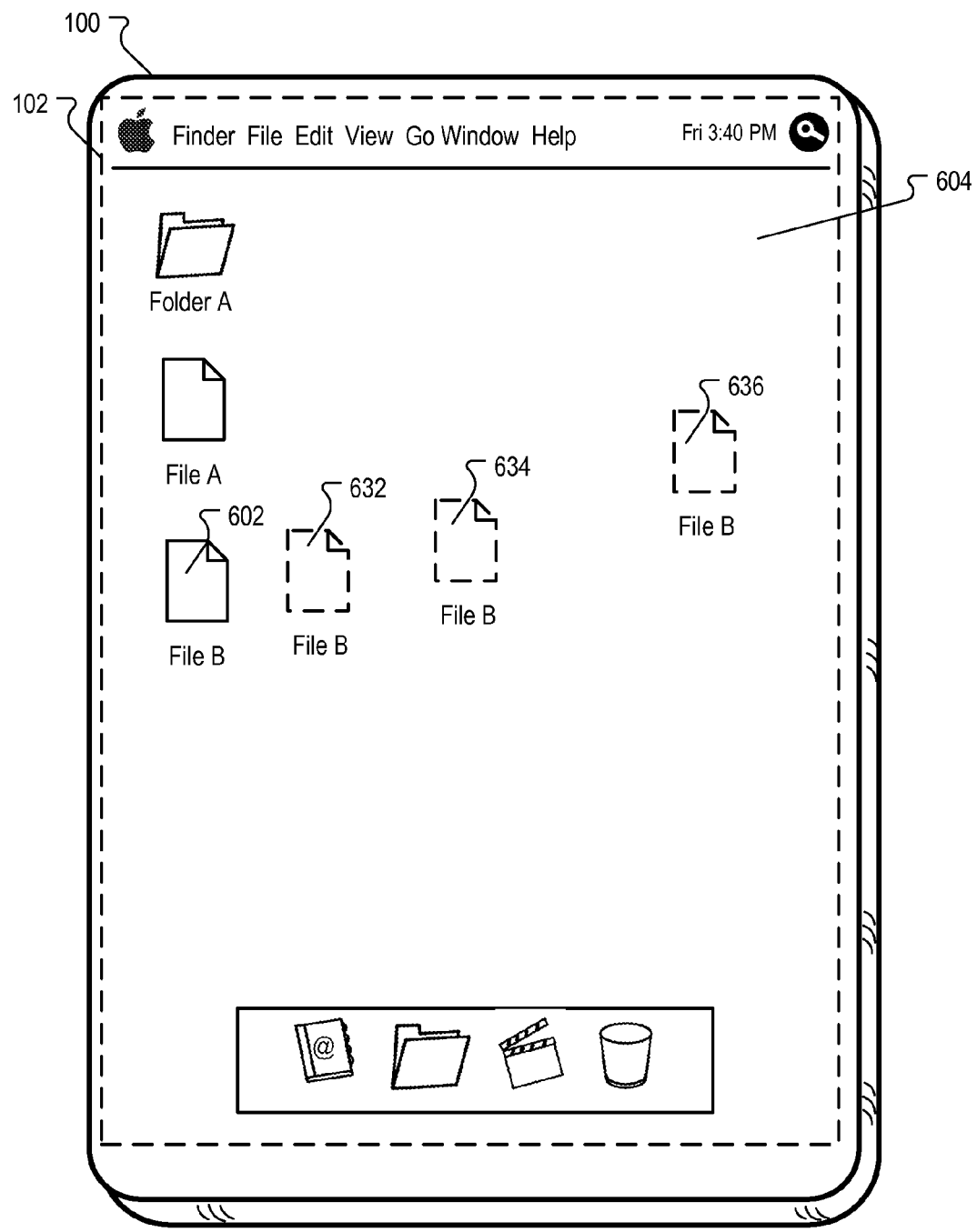

Then, as illustrated in FIG. 6B, the user can provide another touch input 622 corresponding to a gesture flicking object 602 across user interface 604. The user interface can present an animation corresponding to object 602 moving across the screen in response to touch input 622. An example animation is illustrated in FIG. 6C, where display object 602 is shown moving across the user interface 604. Display object 602 moves from its initial position to position 632 to position 634 and finally to position 636, before it disappears from user interface 604.

In some implementations, the animation incorporates one or more laws of physics. For example, display object 602 can continue to increase in velocity as it moves across user interface 604, to simulate an acceleration of the object. As another example, the display object 602 can slow down as it moves across user interface 604, to simulate the effects of friction. The animation can also indicate that the file is being deleted. For example, the animation can show display object 602 exploding as it moves across user interface 604, or the animation can show display object 602 becoming increasingly transparent as it moves across user interface 604.

In response to touch input 622, the device also deletes the system object corresponding to display object 602. In some implementations, the system performs a regular deletion operation. In some implementations, the system performs a secure deletion operation. These operations are described in more detail below with reference to FIG. 7.

Figure 6D:
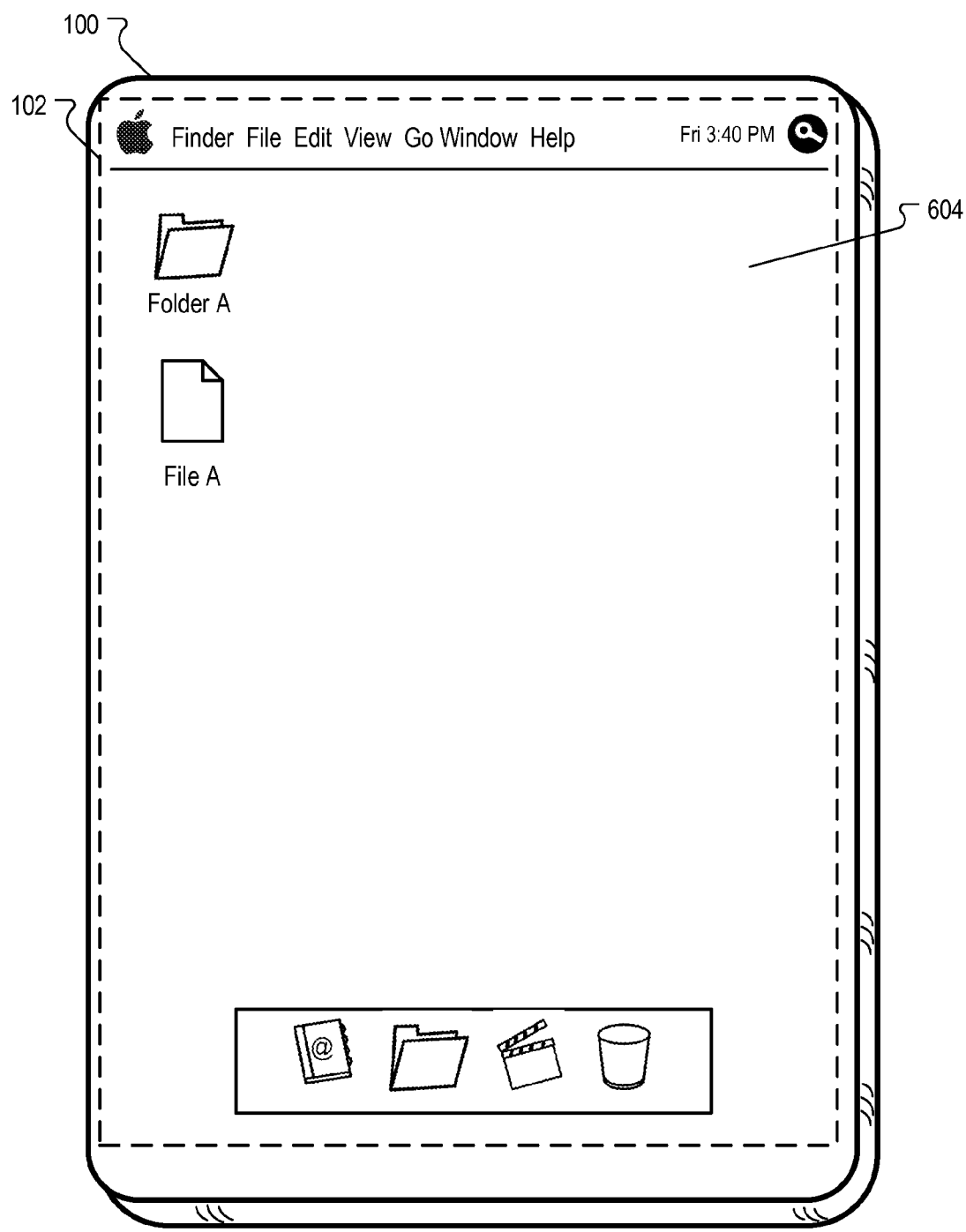

FIG. 6D illustrates user interface 604 after display object 602 has been deleted and removed from the user interface.

Figure 7:
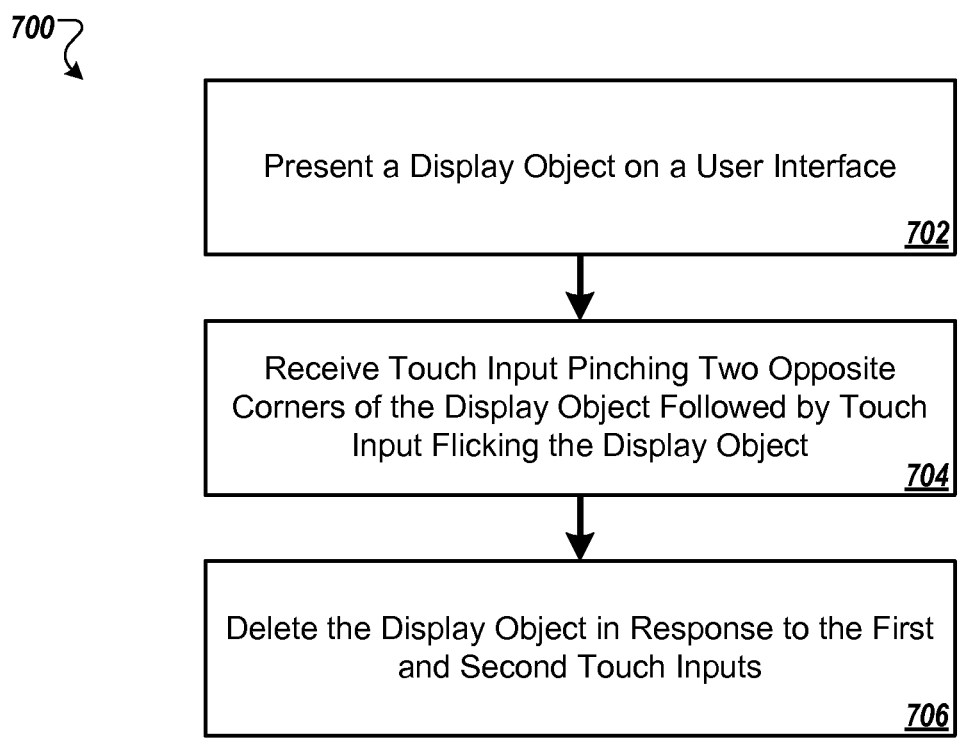
FIG. 7 is a flow diagram of an example process for deleting an object in response to user input pinching and then flicking the object.

Example Process for Deleting a Display Object in Response to Input Pinching and Flicking the Display Object FIG. 7 is a flow diagram of example process 700 for deleting an object in response to user input pinching and then flicking the display object. For convenience, example process 700 will be described in reference to a device that performs process 700. The device can be, for example, device 100.

The device can present a display object on a user interface (702), for example, as described above with reference to FIG. 6A. The device can receive touch input pinching two opposite corners of the display object, followed by touch input flicking the file representation (704), for example, as described above with reference to FIGS. 6A and 6B. Each touch input can be one or more touch input events received from a touch services module executing on the device. The touch services module is described in more detail below with reference to FIG. 12.

The device can delete the display object in response to the first and second touch inputs (706). The device can require the second touch input to follow the first touch input with no intervening inputs, and within an amount of time that is less than a pre-determined threshold, before it performs the deletion.

Deleting the display object can include deleting the system object represented by the display object. The device can perform either a secure deletion or a regular deletion of the system object. A regular deletion marks the portions of a computer readable medium storing the data for the system object as writeable, but does not necessarily overwrite the data. A secure deletion overwrites the system object with alternating patterns of data that make it difficult to recover the file. An example standard for secure deletion is the U.S. Department of Defense standard 5220.22-M. The secure deletion can also delete all backup copies of the system object that are maintained by the device.

In some implementations, the device presents a dialog box to the user to prompt the user to specify that either a secure deletion or a regular deletion should be performed, and then performs the type of deletion specified by the user. In other implementations, the device securely deletes or regularly deletes the system object according to device settings.

The device can require a user to first place the device into a deletion mode before performing the deletion. A user can place the device into a deletion mode using touch input. For example, the user can provide touch input touching at a location of the user interface where no display objects are presented. If the input persists for a period of time that exceeds a threshold, the device can be placed into a deletion state. Once in the deletion state, the device can delete a display object in response to touch inputs, as described above.

Figure 8A:
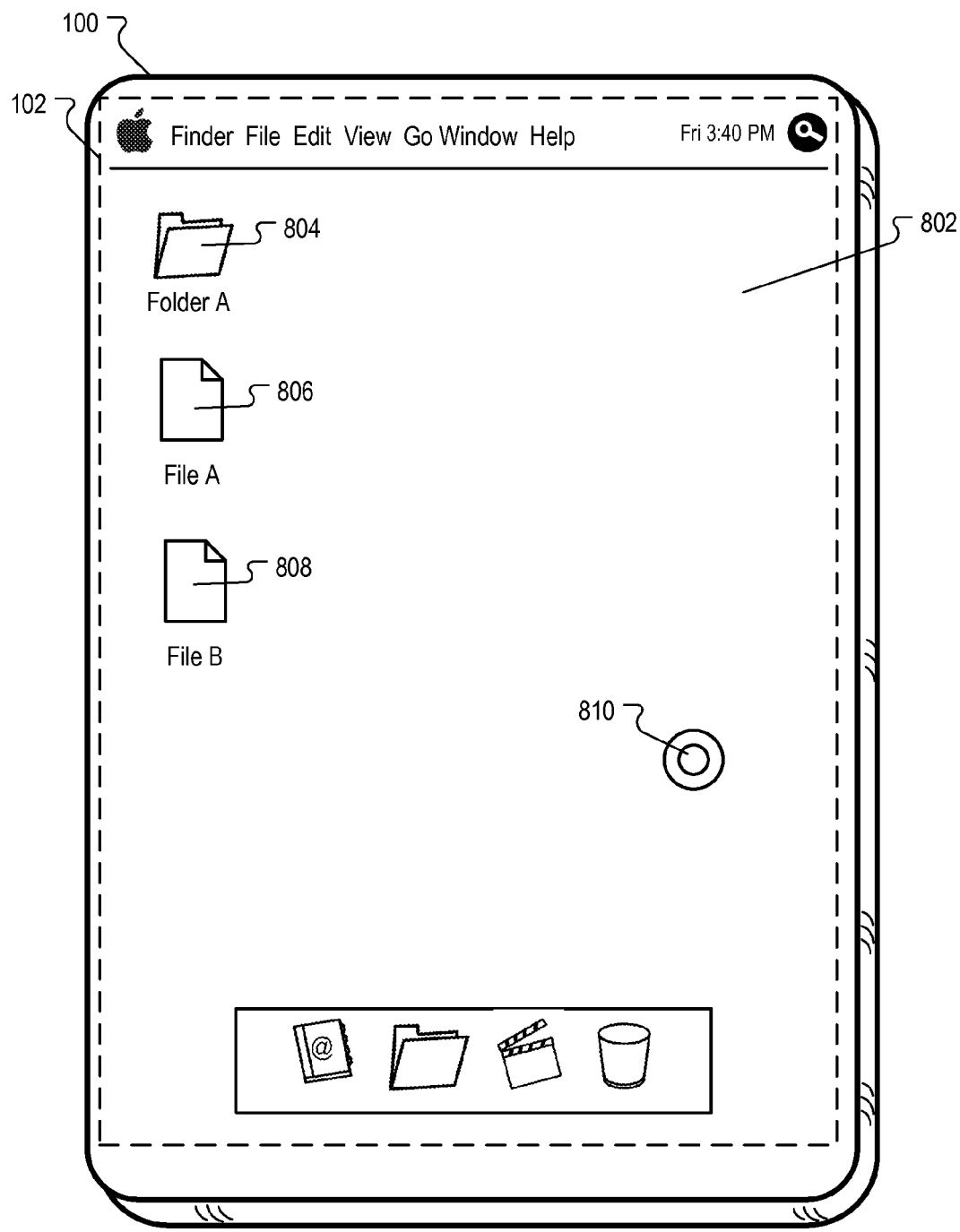
FIGS. 8A-8C illustrate example user interactions deleting a display object displayed on a user interface.
Figure 8B:
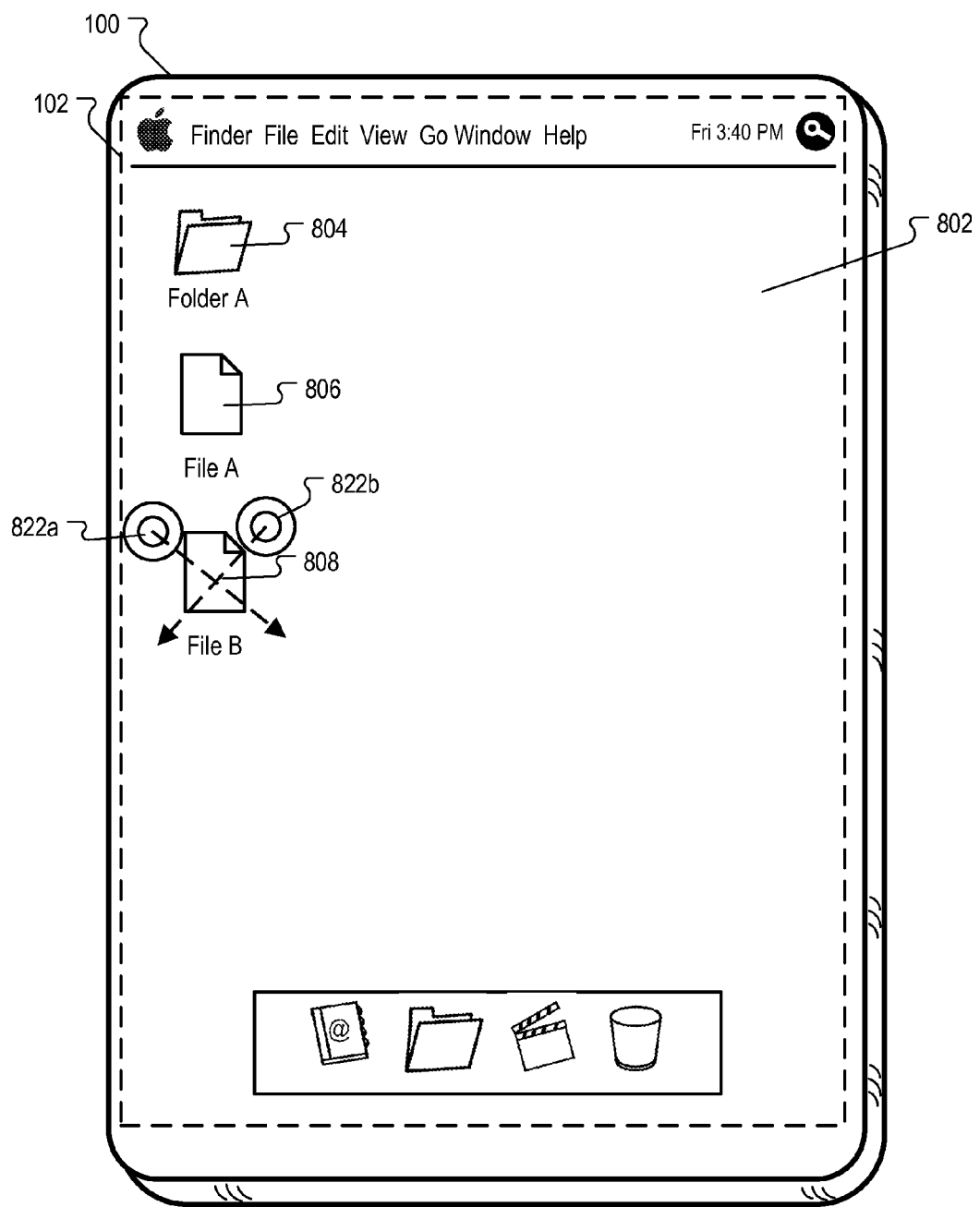
Figure 8C:
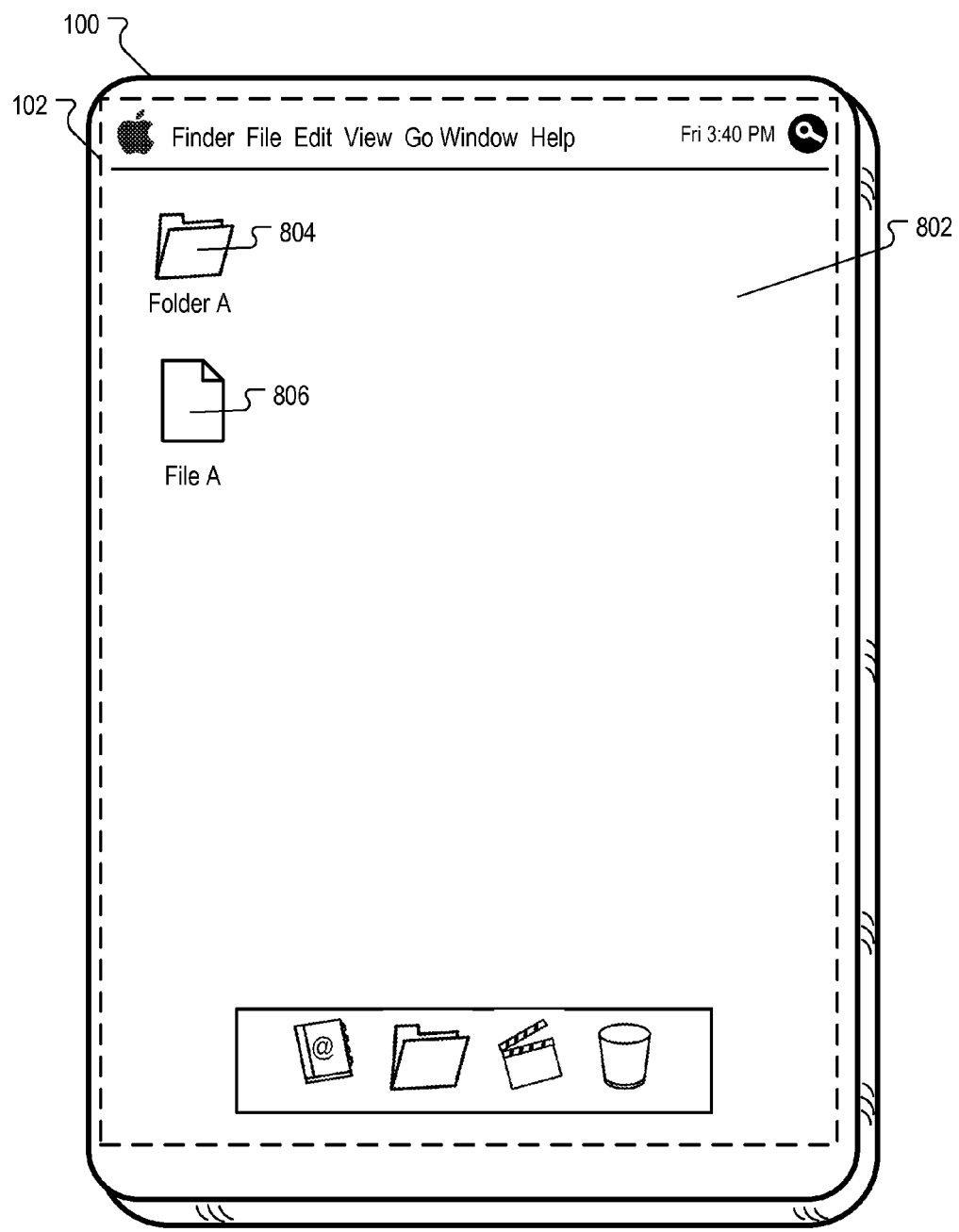

Example Interactions Drawing a Symbol Centered Over a Display Object to Delete the Object FIGS. 8A-8C illustrate example user interactions deleting a display object displayed on user interface 802 of device 100.

User interface 802 presents display objects 804, 806, and 808. A user can delete one of the display objects using a sequence of touch inputs. For example, a user can delete display object 808 as follows. The user first provides input placing the device into a deletion state. The user then provides touch input drawing an symbol that is centered over display object 808.

FIG. 8A illustrates example touch input 810 placing device into a deletion state. Touch input 810 corresponds to a touch input at a single location on the user interface. No display objects are presented at the location where touch input 810 is received. The user continues to provide touch input 810 for at least a threshold amount of time. Device 100 is then put into a deletion state. User interface 802 can indicate that the device is in a deletion state, for example, by changing the appearance of the display objects. For example, the display objects can be presented with dotted outlines, or the display objects can be animated as shaking in place.

FIG. 8B illustrates example touch input 822 drawing a symbol through display object 808 after device 100 has been placed in a deletion state. For illustrative purposes, the symbol shown in FIG. 8 is an X. However, other symbols, for example, a symbol drawn by circling the object and then drawing a diagonal line through the object could also be used.

Touch input 822 consists of a first gesture 822a drawing a first diagonal line through display object 808, and a second gesture 822b drawing a second diagonal line through display object 808. The second diagonal line is substantially perpendicular to the first diagonal line. Together, the two gestures 822a and 822b form an X that is centered over the display object 808.

In response to touch input 822, device 100 deletes display object 808. The deletion can be a secure deletion, or a regular deletion, as described in more detail below with reference to FIG. 9. The user interface 802 can present an animation corresponding to the deletion of display object 808. For example, display object 808 can be animated as shrinking and then disappearing, as exploding, or as becoming increasingly transparent.

FIG. 8C illustrates user interface 802 after display object 808 has been deleted.

Figure 9:
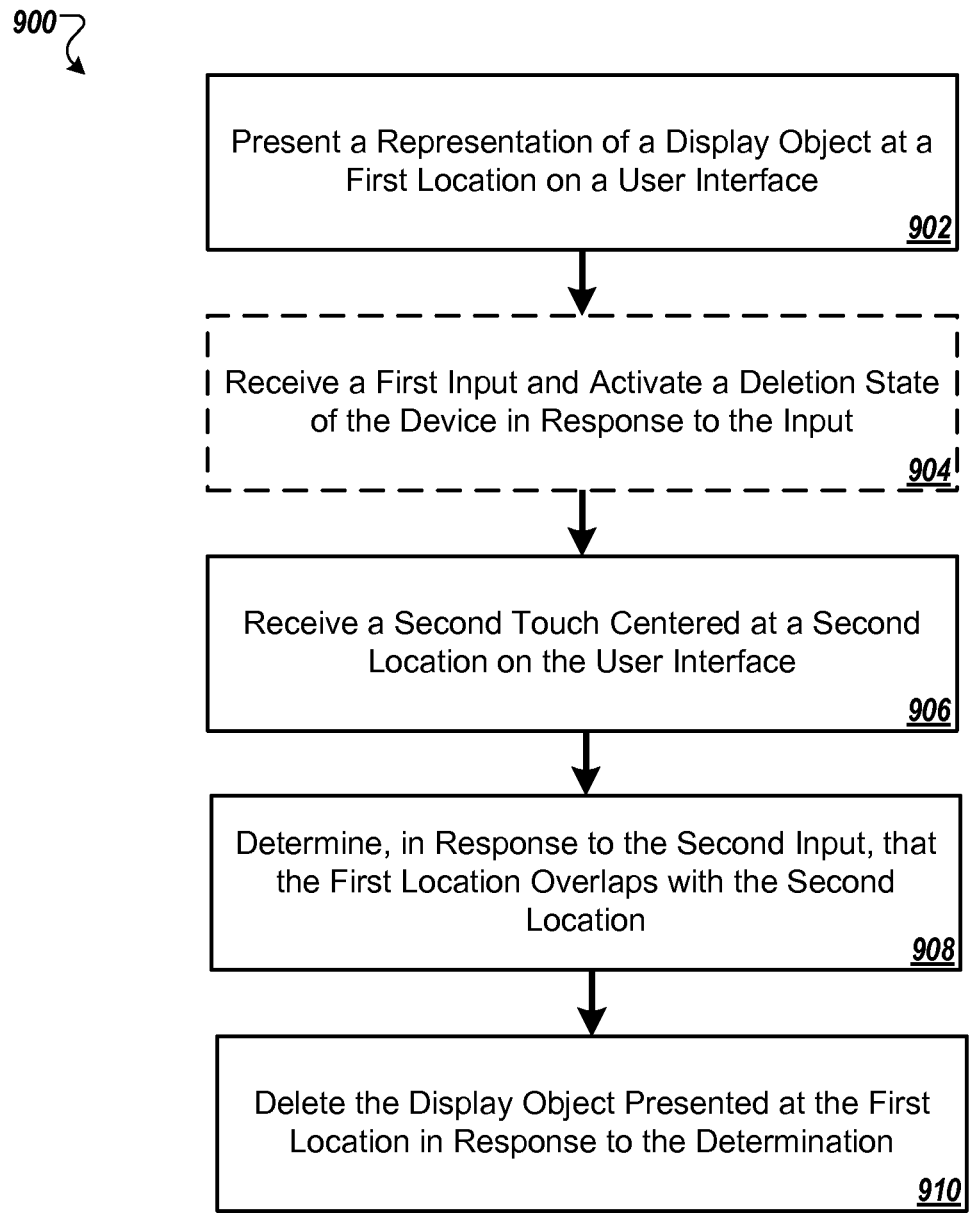
FIG. 9 is a flow diagram of an example process for deleting an object in response to user input drawing a symbol centered over the object.

Example Process for Deleting a Display Object in Response to Drawing a Symbol Centered Over the Display Object FIG. 9 is a flow diagram of example process 900 for deleting an object in response to user input drawing a symbol centered over the object. For convenience, example process 900 will be described in reference to a device that performs process 900. The device can be, for example, device 100.

The device can present a display object at a first location on a user interface (902). The user interface can be, for example, the user interface 802 described above with reference to FIG. 8.

The device can optionally receive a first input and activate a deletion state of the device in response to the input (904). The first input can be touch input received as a touch event from a touch model. For example, the first input can be generated when a user presses and holds in a single location on the user interface for more than a threshold amount of time.

The device receives second touch input centered at a second location on the user interface (906). The second touch input can correspond to a symbol, for example, an X or a circle with a diagonal line through it.

For example, the device can receive touch input corresponding to an X when a user makes a first gesture along a first diagonal line, and a second gesture along a second diagonal line that is substantially perpendicular to the first diagonal line, as described above with reference to FIG. 8. The X is centered where the two gestures overlap. The device can require the two gestures to be received within a predetermined period of time of each other, before they are interpreted as an X.

The device can determine, in response to the second input, that the first location overlaps with the second location (908). The first location overlaps with the second location if the two locations are identical, or are within a threshold distance of each other.

The system can delete the display object presented at the first location in response to the determination (910). The system can perform a secure deletion or a regular deletion. In some implementations, the system determines whether to perform a secure deletion or a regular deletion according to input received from a user, for example, as described above with reference to FIG. 7.

Example Interactions Securely Deleting a Display Object

Figure 10A:
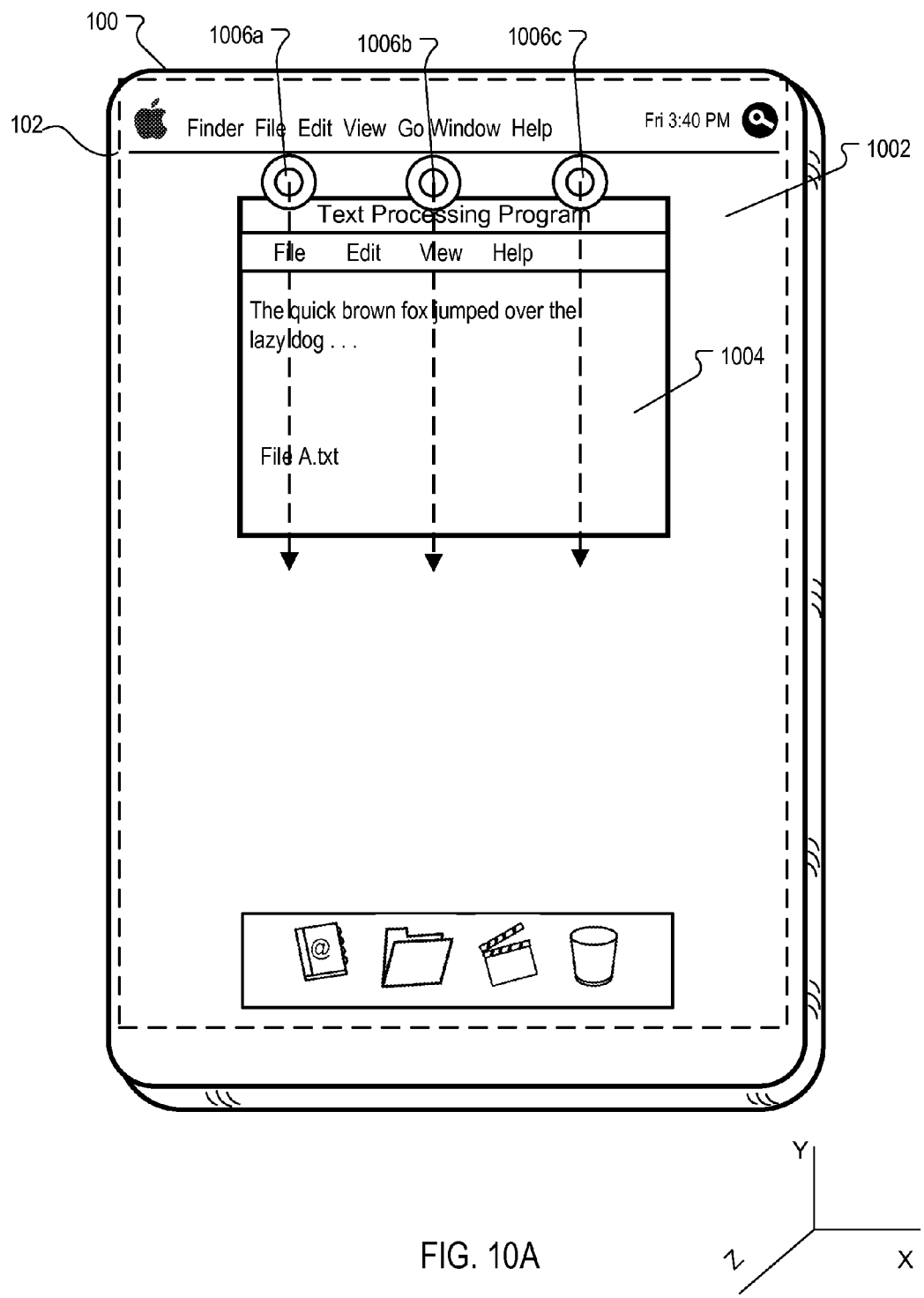
FIGS. 10A-10B illustrate example user interactions securely deleting a display object displayed on a user interface.
Figure 10B:
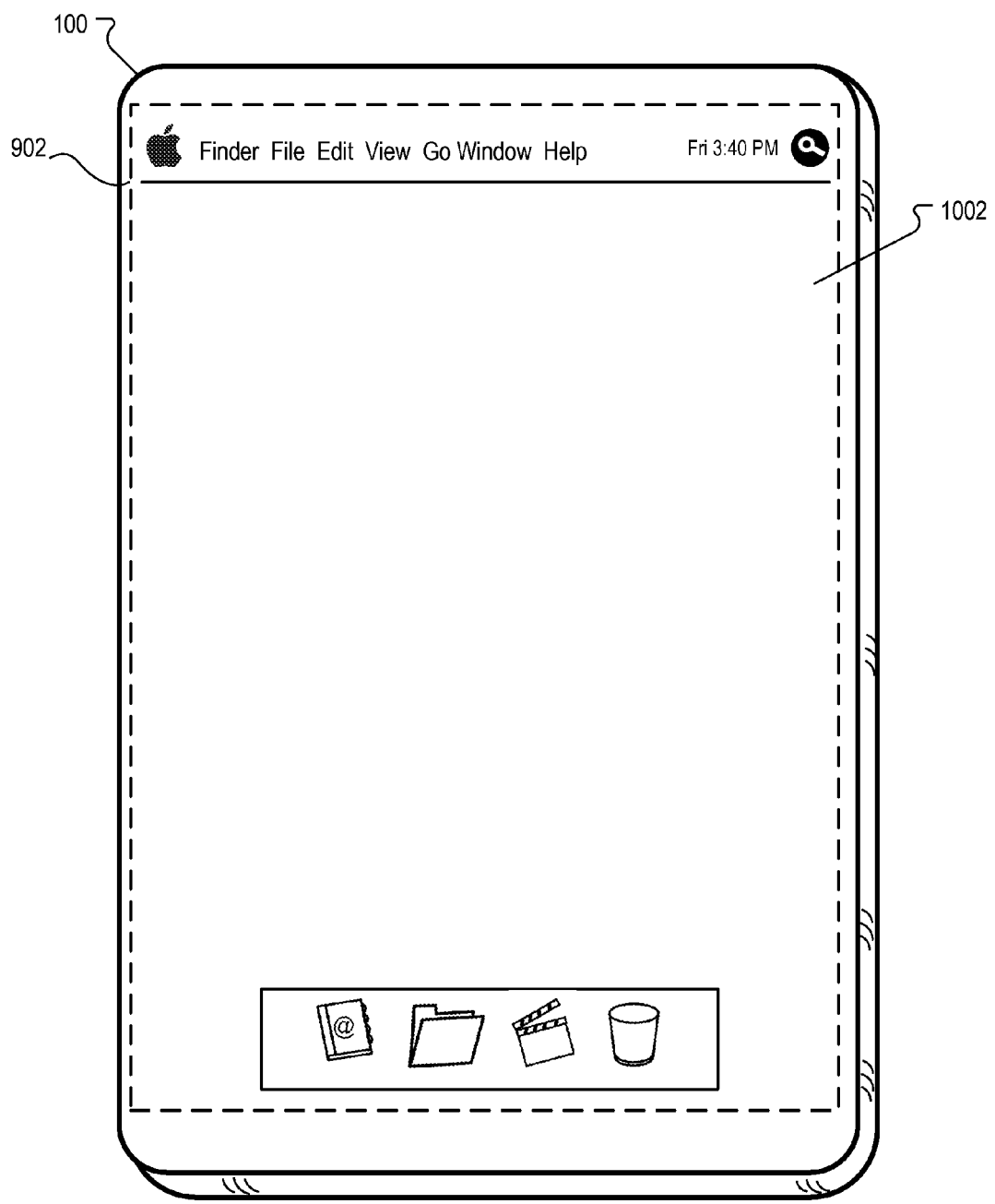

FIGS. 10A-10B illustrate example user interactions shredding, e.g., securely deleting, a display object displayed on user interface 1002 of device 100.

User interface 1002 presents display object 1004 corresponding to a system window presenting the contents of a file. A user can securely delete the display object 1004 by providing touch input 1006 with multiple (e.g., two or more) fingers of a single hand. The touch input corresponds to a swiping gesture made substantially simultaneously with each finger used to provide input. The swiping gesture is made over display object 1004.

For illustrative purposes, touch input 1006 is illustrated in FIG. 10A as corresponding to three fingers providing a swiping input in the y-direction. However, a different number of fingers and/or a different swiping direction could also be used.

In response to touch input 1006, the device 100 securely deletes the display object 1004 by securely deleting the system object corresponding to the display object. The user interface 1002 can also present an animation indicating that the display object is being deleted. For example, user interface 1002 can present an animation showing display object 1004 being torn into multiple strips. The number of strips can correspond to the number of points of input, and the direction of the strips can correspond to the direction of touch input 1006. The user interface can also remove display object 1004 as part of the deletion.

FIG. 10B illustrates user interface 1002 after display object 1004 has been removed from the user interface.

Example Process for Securely Deleting a Display Object

Figure 11:
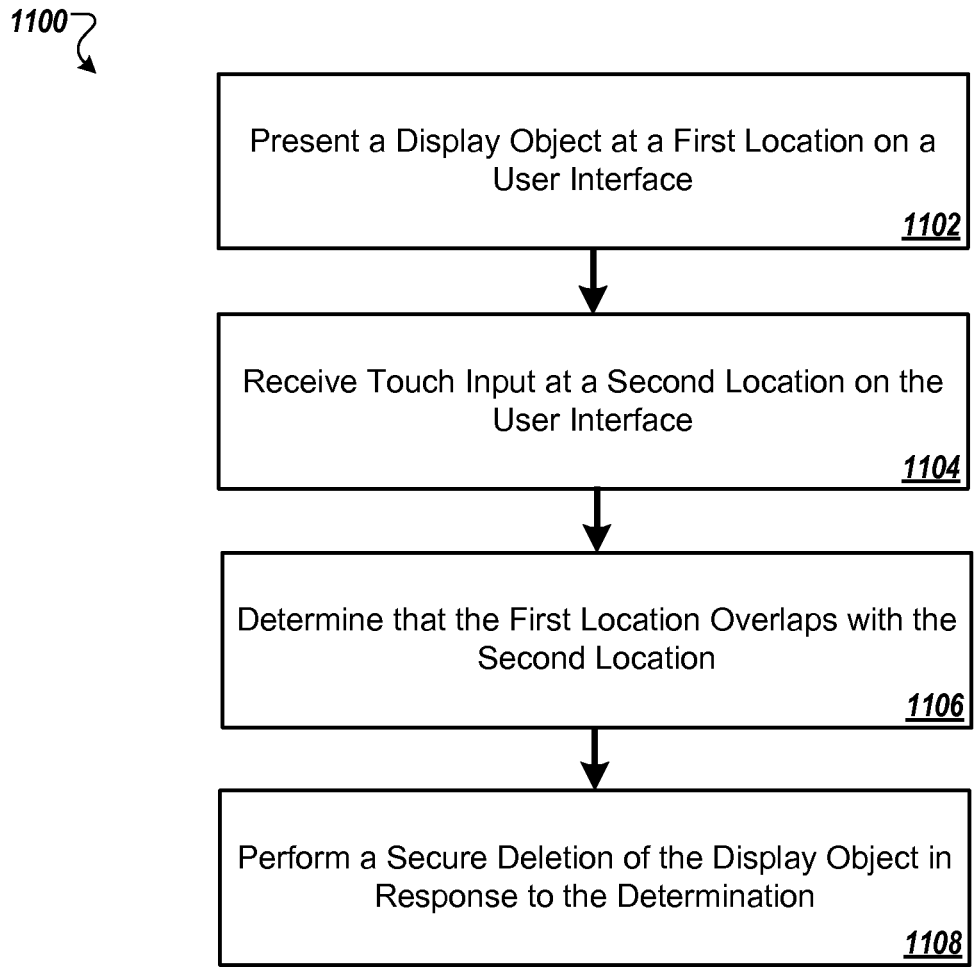
FIG. 11 is a flow diagram of an example process for securely deleting an object in response to touch input.

FIG. 11 is a flow diagram of example process 1100 for securely deleting an object in response to touch input. For convenience, example process 1100 will be described in reference to a device that performs process 1100. The device can be, for example, device 100.

The device can present a display object at a first location on a user interface (1102), for example, as described above with reference to FIG. 10A. The device can receive touch input at a second location on the user interface (1104). The touch input can correspond to swiping gestures made with two or more fingers of a single hand and made substantially simultaneously, for example, as described above with reference to FIG. 10A.

The device can determine that the first location overlaps with the second location (1106). The device can determine that the first location overlaps with the second location if the two locations are identical, or are within a threshold distance of each other, for example, as described above with reference to FIG. 9. The device can perform a secure deletion of the display object in response to the determination (1108). Secure deletions are described in more detail above, with reference to FIG. 7.

In some implementations, the device can require a user to first place the device into a shredding mode before performing the secure deletion. A user can place the device into a shredding mode using touch input. For example, the user can provide touch input touching at a location of the user interface where no display objects are presented. If the input persists for a period of time that exceeds a threshold, the device can be placed into a shredding state. Once in the deletion state, the device can securely delete a display object in response to touch inputs, as described above.

Example Software Architecture

Figure 12:
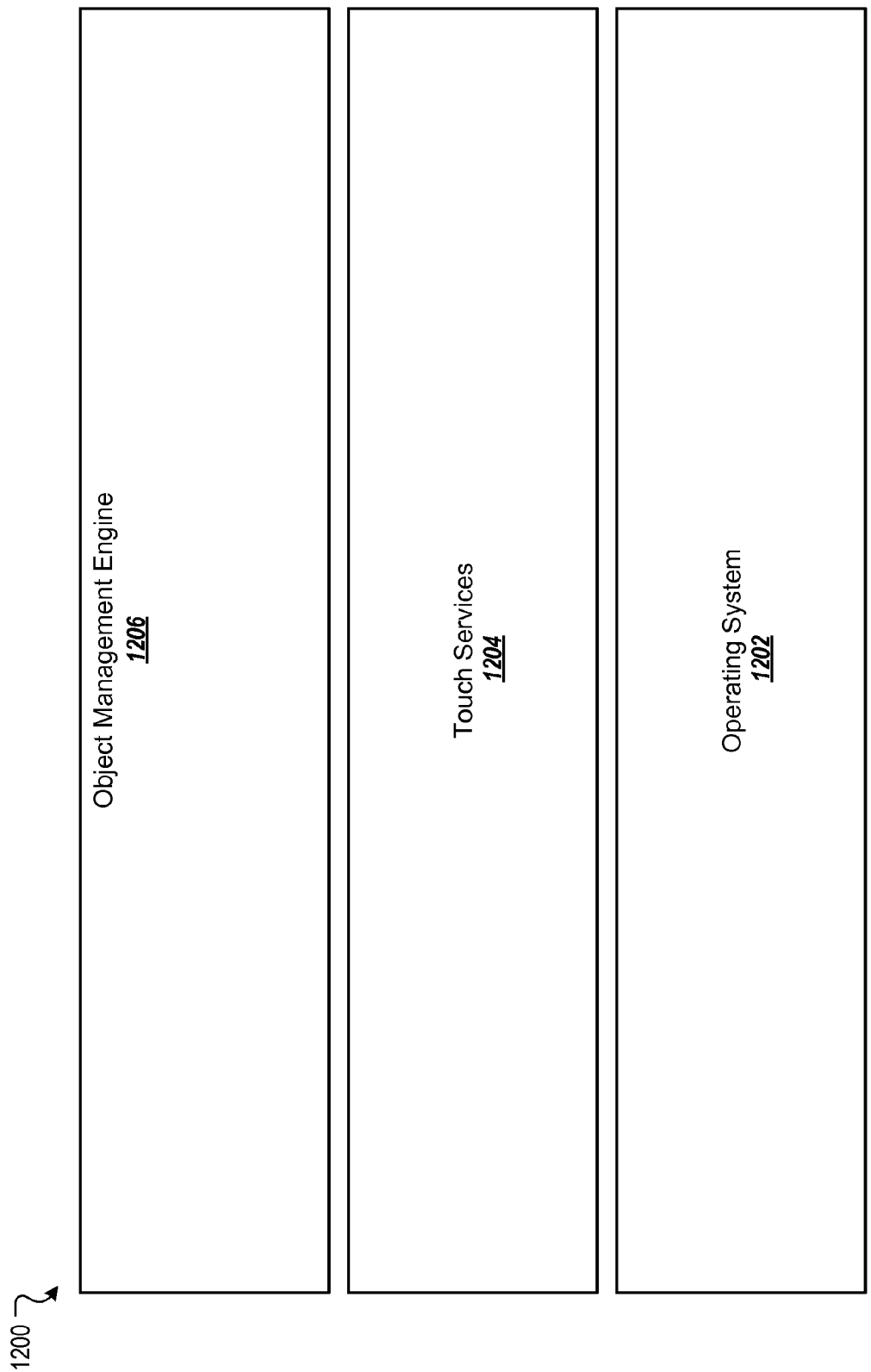
FIG. 12 illustrates an example software architecture for implementing display object interactions.

FIG. 12 illustrates example software architecture 1200 for implementing the display object interactions described above. Example software architecture 1200 can be used to implement the methods described above with reference to FIGS. 3-5, 7, 9, and 11.

Software architecture 1200 can include operating system 1202, touch services module 1204, and object management engine 1206. This architecture can conceptually operate on top of a hardware layer (not shown).

Operating system 1202 provides an interface to the hardware layer (e.g., a capacitive touch display or device). Operating system 1202 can include one or more software drivers that communicate with the hardware. For example, the drivers can receive and process touch input signals generated by a touch sensitive display or device in the hardware layer. The operating system 1202 can process raw input data received from the driver(s). This processed input data can then made available to touch services layer 804 through one or more application programming interfaces (APIs). These APIs can be a set of APIs that are usually included with operating systems (such as, for example, Linux or UNIX APIs), as well as APIs specific for sending and receiving data relevant to touch input.

Touch services module 1204 can receive touch inputs from operating system layer 1202 and convert one or more of these touch inputs into touch input events according to an internal touch event model. Touch services module 1204 can use different touch models for different applications, for example, depending on a state of the device.

The touch input events can be in a format that is easier to use in an application than raw touch input signals generated by the touch sensitive device. For example, a touch input event can include a set of coordinates for each location at which a touch is currently occurring on a drafting user interface. Each touch input event can include information on one or more touches occurring simultaneously.

In some implementations, gesture touch input events can also be detected by combining two or more touch input events. The gesture touch input events can contain scale and/or rotation information. The rotation information can include a rotation value that is a relative delta in degrees. The scale information can also include a scaling value that is a relative delta in pixels on the display device. Other gesture events are possible.

All or some of these touch input events can be made available to developers through a touch input event API. The touch input API can be made available to developers as a Software Development Kit (SDK) or as part of an application (e.g., as part of a browser tool kit).

Object management engine 1206 receives touch inputs from the touch services module 1204 and processes the input events, for example, as described above with reference to FIGS. 1-11.

Example Device Architecture

Figure 13:
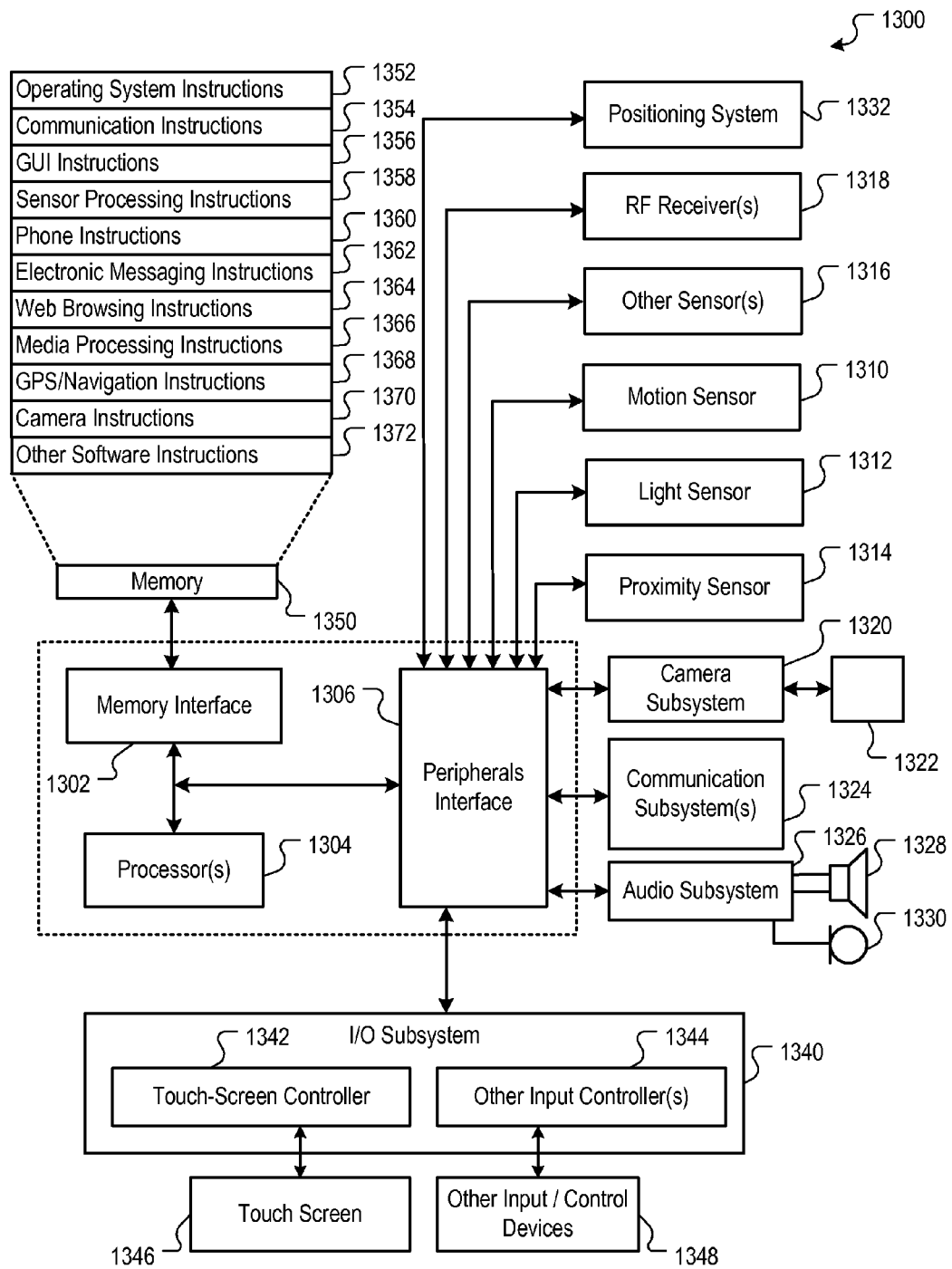
FIG. 13 is a block diagram of an example hardware architecture of a device for processing touch inputs interacting with display objects.

FIG. 13 is a block diagram of example hardware architecture of device 1300 for processing touch inputs interacting with display objects. Device 1300 can include memory interface 1302, one or more data processors, image processors and/or central processing units 1304, and peripherals interface 1306. Memory interface 1302, one or more processors 1304 and/or peripherals interface 1306 can be separate components or can be integrated in one or more integrated circuits. The various components in device 1300 can be coupled by one or more communication buses or signal lines.

Sensors, devices, and subsystems can be coupled to peripherals interface 1306 to facilitate multiple functionalities. For example, motion sensor 1310, light sensor 1312, and proximity sensor 1314 can be coupled to peripherals interface 1306 to facilitate various orientation, lighting, and proximity functions. For example, in some implementations, light sensor 1312 can be utilized to facilitate adjusting the brightness of touch screen 1346. In some implementations, motion sensor 1311 (e.g., an accelerometer, velocimeter, or gyroscope) can be utilized to detect movement of the device. Accordingly, display objects and/or media can be presented according to a detected orientation, e.g., portrait or landscape.

Other sensors 1316 can also be connected to peripherals interface 1306, such as a temperature sensor, a biometric sensor, or other sensing device, to facilitate related functionalities.

Location determination functionality can be facilitated through positioning system 1332. Positioning system 1332, in various implementations, can be a component internal to device 1300, or can be an external component coupled to device 1300 (e.g., using a wired connection or a wireless connection). In some implementations, positioning system 1332 can include a GPS receiver and a positioning engine operable to derive positioning information from received GPS satellite signals. In other implementations, positioning system 1332 can include a compass (e.g., a magnetic compass) and an accelerometer, as well as a positioning engine operable to derive positioning information based on dead reckoning techniques. In still further implementations, positioning system 1332 can use wireless signals (e.g., cellular signals, IEEE 802.11 signals) to determine location information associated with the device Hybrid positioning systems using a combination of satellite and television signals, such as those provided by ROSUM CORPORATION of Mountain View, Calif., can also be used. Other positioning systems are possible.

Broadcast reception functions can be facilitated through one or more radio frequency (RF) receiver(s) 1318. An RF receiver can receive, for example, AM/FM broadcasts or satellite broadcasts (e.g., XM® or Sirius® radio broadcast). An RF receiver can also be a TV tuner. In some implementations, RF receiver 1118 is built into wireless communication subsystems 1324. In other implementations, RF receiver 1318 is an independent subsystem coupled to device 1300 (e.g., using a wired connection or a wireless connection). RF receiver 1318 can receive simulcasts. In some implementations, RF receiver 1318 can include a Radio Data System (RDS) processor, which can process broadcast content and simulcast data (e.g., RDS data). In some implementations, RF receiver 1318 can be digitally tuned to receive broadcasts at various frequencies. In addition, RF receiver 1318 can include a scanning function which tunes up or down and pauses at a next frequency where broadcast content is available.

Camera subsystem 1320 and optical sensor 1322, e.g., a charged coupled device (CCD) or a complementary metal-oxide semiconductor (CMOS) optical sensor, can be utilized to facilitate camera functions, such as recording photographs and video clips.

Communication functions can be facilitated through one or more communication subsystems 1324. Communication subsystem(s) can include one or more wireless communication subsystems and one or more wired communication subsystems. Wireless communication subsystems can include radio frequency receivers and transmitters and/or optical (e.g., infrared) receivers and transmitters. Wired communication system can include a port device, e.g., a Universal Serial Bus (USB) port or some other wired port connection that can be used to establish a wired connection to other computing devices, such as other communication devices, network access devices, a personal computer, a printer, a display screen, or other processing devices capable of receiving and/or transmitting data. The specific design and implementation of communication subsystem 1324 can depend on the communication network(s) or medium(s) over which device 1300 is intended to operate. For example, device 1300 may include wireless communication subsystems designed to operate over a global system for mobile communications (GSM) network, a GPRS network, an enhanced data GSM environment (EDGE) network, 802.x communication networks (e.g., Wi-Fi, WiMax, or 3G networks), code division multiple access (CDMA) networks, and a Bluetooth™ network. Communication subsystems 1324 may include hosting protocols such that Device 1300 may be configured as a base station for other wireless devices. As another example, the communication subsystems can allow the device to synchronize with a host device using one or more protocols, such as, for example, the TCP/IP protocol, HTTP protocol, UDP protocol, and any other known protocol.

Audio subsystem 1326 can be coupled to speaker 1328 and one or more microphones 1330. One or more microphones 1330 can be used, for example, to facilitate voice-enabled functions, such as voice recognition, voice replication, digital recording, and telephony functions.

I/O subsystem 1340 can include touch screen controller 1342 and/or other input controller(s) 1344. Touch-screen controller 1342 can be coupled to touch screen 1346. Touch screen 1346 and touch screen controller 1342 can, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch screen 1346 or proximity to touch screen 1346.

Other input controller(s) 1344 can be coupled to other input/control devices 1348, such as one or more buttons, rocker switches, thumb-wheel, infrared port, USB port, and/or a pointer device such as a stylus. The one or more buttons (not shown) can include an up/down button for volume control of speaker 1328 and/or microphone 1330.

In one implementation, a pressing of the button for a first duration may disengage a lock of touch screen 1346; and a pressing of the button for a second duration that is longer than the first duration may turn power to device 1300 on or off. The user may be able to customize a functionality of one or more of the buttons. Touch screen 1346 can, for example, also be used to implement virtual or soft buttons and/or a keyboard.

In some implementations, device 1300 can present recorded audio and/or video files, such as MP3, AAC, and MPEG files. In some implementations, device 1300 can include the functionality of an MP3 player, such as an iPhone™

Memory interface 1302 can be coupled to memory 1350. Memory 1350 can include high-speed random access memory and/or non-volatile memory, such as one or more magnetic disk storage devices, one or more optical storage devices, and/or flash memory (e.g., NAND, NOR). Memory 1350 can store operating system 1352, such as Darwin, RTXC, LINUX, UNIX, OS X, WINDOWS, or an embedded operating system such as VxWorks. Operating system 1352 may include instructions for handling basic system services and for performing hardware dependent tasks. In some implementations, operating system 1352 can be a kernel (e.g., UNIX kernel).

Memory 1350 may also store communication instructions 1354 to facilitate communicating with one or more additional devices, one or more computers and/or one or more servers. Communication instructions 1354 can also be used to select an operational mode or communication medium for use by the device, based on a geographic location (obtained by GPS/Navigation instructions 1368) of the device. Memory 1350 may include graphical user interface instructions 1356 to facilitate graphic user interface processing; sensor processing instructions 1358 to facilitate sensor-related processing and functions; phone instructions 1360 to facilitate phone-related processes and functions; electronic messaging instructions 1362 to facilitate electronic-messaging related processes and functions; web browsing instructions 1364 to facilitate web browsing-related processes and functions; media processing instructions 1366 to facilitate media processing-related processes and functions; GPS/Navigation instructions 1368 to facilitate GPS and navigation-related processes and instructions, e.g., mapping a target location; camera instructions 1370 to facilitate camera-related processes and functions; and/or other software instructions 1372 to facilitate other processes and functions, e.g., security processes and functions, device customization processes and functions (based on predetermined user preferences), and other software functions. Memory 1350 may also store other software instructions (not shown), such as web video instructions to facilitate web video-related processes and functions; and/or web shopping instructions to facilitate web shopping-related processes and functions. In some implementations, media processing instructions 1366 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. Memory 1350 can include additional instructions or fewer instructions. Furthermore, various functions of device 1300 may be implemented in hardware and/or in software, including in one or more signal processing and/or application specific integrated circuits.

Network Operating Environment for a Device

Figure 14:
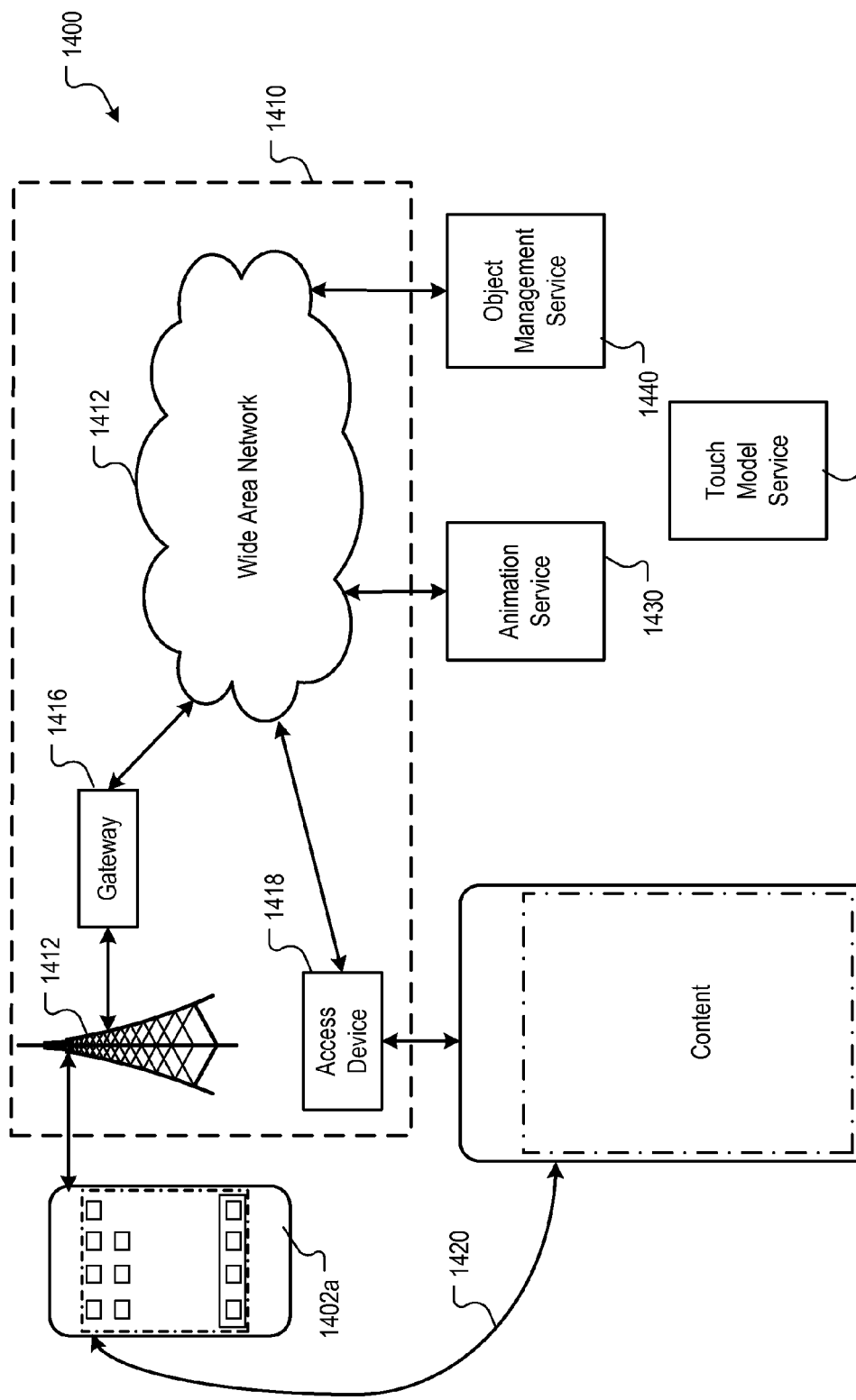
FIG. 14 is a block diagram of an example network operating environment for a device implementing interactions with display objects.

FIG. 14 is a block diagram of example network operating environment 1400 for a device implementing the operations described above. Devices 1402a and 1402b can, for example, communicate over one or more wired and/or wireless networks 1410 in data communication. For example, wireless network 1412, e.g., a cellular network, can communicate with a wide area network (WAN) 1414, such as the Internet, by use of gateway 1416. Likewise, access device 1418, such as an 802.11g wireless access device, can provide communication access to wide area network 1414. In some implementations, both voice and data communications can be established over wireless network 1412 and access device 1418. For example, device 1402a can place and receive phone calls (e.g., using VoIP protocols), send and receive e-mail messages (e.g., using POP3 protocol), and retrieve electronic documents and/or streams, such as web pages, photographs, and videos, over wireless network 1412, gateway 1416, and wide area network 1414 (e.g., using TCP/IP or UDP protocols). Likewise, in some implementations, device 1402b can place and receive phone calls, send and receive e-mail messages, and retrieve electronic documents over access device 1418 and wide area network 1414. In some implementations, devices 1402a or 1402b can be physically connected to access device 1418 using one or more cables and access device 1418 can be a personal computer. In this configuration, device 1402a or 1402b can be referred to as a "tethered" device.

Devices 1402a and 1402b can also establish communications by other means. For example, wireless device 1402a can communicate with other wireless devices, e.g., other devices 1402a or 1402b, cell phones, etc., over wireless network 1412. Likewise, devices 1402a and 1402b can establish peer-to-peer communications 1420, e.g., a personal area network, by use of one or more communication subsystems, such as a Bluetooth™ communication device. Other communication protocols and topologies can also be implemented.

Devices 1402a or 1402b can, for example, communicate with one or more services over one or more wired and/or wireless networks 1410. These services can include, for example, animation service 1430, object management service 1440, and touch model service 1450. Animation service 1430 generates the animations described above when display objects are moved, deleted, and securely deleted. Object management service 1440 determines how to process display objects and their corresponding system objects, for example, as described above with reference to FIG. 12. Touch model service 1450 provides the touch model features described above with reference to FIG. 12.

Device 1402a or 1402b can also access other data and content over one or more wired and/or wireless networks 1410. For example, content publishers, such as news sites, RSS feeds, web sites, blogs, social networking sites, developer networks, etc., can be accessed by Device 1402a or 1402b. Such access can be provided by invocation of a web browsing function or application (e.g., a browser) in response to a user touching, for example, a Web object.

The features described can be implemented in digital electronic circuitry, or in computer hardware, firmware, software, or in combinations of them. The features can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. Alternatively or addition, the program instructions can be encoded on a propagated signal that is an artificially generated signal, e.g., a machine-generated electrical, optical, or electromagnetic signal, that is generated to encode information from transmission to suitable receiver apparatus for execution by a programmable processor.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an Application Programming Interface (API). An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method, comprising:
   presenting a display object on a user interface of a device with a touch-sensitive display;
   receiving a first touch input pinching two opposite corners of the display object on the touch-sensitive display followed by receiving a second touch input flicking the display object on the touch-sensitive display; and
   deleting the display object in response to receiving the first and second touch inputs.

2. The method of claim 1, further comprising placing the device in a deletion state in response to user input.

3. The method of claim 1, wherein the second touch input follows the first touch input with no intervening inputs and within a threshold amount of time.

4. The method of claim 1, further comprising presenting an animation of the display object moving off the screen in response to receiving the first and second touch inputs.

5. The method of claim 1, further comprising presenting an animation of the display object shrinking in response to the first touch input.

6. A multifunction device, comprising:
   a touch-sensitive display;
   one or more processors;
   memory; and
   one or more programs, wherein the one or more programs are stored in the memory and configured to be executed by the one or more processors, the one or more programs including instructions for:
   presenting a display object on a user interface of the device with a touch-sensitive display;
   receiving a first touch input pinching two opposite corners of the display object on the touch-sensitive display followed by receiving a second touch input flicking the display object; and
   deleting the display object in response to receiving the first and second touch inputs.

7. The device of claim 6, further comprising instructions for placing the device in a deletion state in response to user input.

8. The device of claim 6, wherein the second touch input follows the first touch input with no intervening inputs and within a threshold amount of time.

9. The device of claim 6, further comprising instructions for presenting an animation of the display object moving off the screen in response to receiving the first and second touch inputs.

10. The device of claim 6, further comprising instructions for presenting an animation of the display object shrinking in response to the first touch input.

11. A non-transitory computer storage medium storing one or more programs comprising instructions, which when executed by a multifunction device with a touch-sensitive display, cause the device to perform operations comprising:
- presenting a display object on a user interface of the device with a touch-sensitive display;
- receiving a first touch input pinching two opposite corners of the display object on the touch-sensitive display followed by receiving a second touch input flicking the display object on the touch-sensitive display; and
- deleting the display object in response to receiving the first and second touch inputs.

12. The non-transitory computer storage medium of claim 11, further including instructions that cause the device to perform operations including placing the device in a deletion state in response to user input.

13. The non-transitory computer storage medium of claim 11, wherein the second touch input follows the first touch input with no intervening inputs and within a threshold amount of time.

14. The non-transitory computer storage medium of claim 11, further including instructions that cause the device to perform operations including presenting an animation of the display object moving off the screen in response to receiving the first and second touch inputs.

15. The non-transitory computer storage medium of claim 11, further including instructions that cause the device to perform operations including presenting an animation of the display object shrinking in response to the first touch input.

* * * * *